US007425061B2

(12) United States Patent
Korn et al.

(10) Patent No.: US 7,425,061 B2
(45) Date of Patent: Sep. 16, 2008

(54) INK CONSUMPTION DETERMINATION

(75) Inventors: Scott J. Korn, Portland, OR (US); James D. Buehler, Troutdale, OR (US); David L. Knierim, Wilsonville, OR (US); Gustavo J. Yusem, Tigard, OR (US)

(73) Assignee: Xerox Corporation, Norwalk, CT (US)

(*) Notice: Subject to any disclaimer, the term of this patent is extended or adjusted under 35 U.S.C. 154(b) by 419 days.

(21) Appl. No.: 11/149,342

(22) Filed: Jun. 9, 2005

(65) Prior Publication Data

US 2006/0279617 A1 Dec. 14, 2006

(51) Int. Cl.
*B41J 2/175* (2006.01)
*G01D 11/00* (2006.01)

(52) U.S. Cl. .......................................... 347/88; 347/99

(58) Field of Classification Search .................. 347/88, 347/99, 84, 85, 95

See application file for complete search history.

(56) References Cited

U.S. PATENT DOCUMENTS 2,503,670 A 4/1950 Hilberry
5,181,049 A 1/1993 Mackay et al.
5,341,164 A * 8/1994 Miyazawa et al. ............ 347/88
5,406,315 A * 4/1995 Allen et al. ..................... 347/7
5,424,767 A * 6/1995 Alavizadeh et al. ........... 347/17
5,442,387 A * 8/1995 Loofbourow et al. ......... 347/88
5,489,925 A * 2/1996 Brooks et al. .................. 347/6
5,694,156 A * 12/1997 Hoisington et al. ............ 347/7
5,861,903 A * 1/1999 Crawford et al. .............. 347/88
5,975,690 A * 11/1999 Grellmann et al. ............ 347/88

(Continued)

FOREIGN PATENT DOCUMENTS

EP 0 654 351 A 5/1995

(Continued)

OTHER PUBLICATIONS

Copending U.S. Patent Application No., filed concurrently herewith, entitled "Ink Jet Printer Performance Adjustment," by James D. Buehler et al., Pub Date: Dec. 14, 2006.

(Continued)

*Primary Examiner*—Stephen D Meier
*Assistant Examiner*—Leonard S Liang
(74) *Attorney, Agent, or Firm*—Maginot, Moore & Beck

(57) ABSTRACT

An ink jet printer includes an ink supply system and a printhead with nozzles for ejecting ink drops. The printer determines the average size of the ejected ink drops by comparing the number of ink drops ejected in a predetermined time with the quantity of ink delivered through the printers ink supply system during that time. If the determined average ink drop size does not match predetermined ink drop size criteria, the printer adjusts the activation signals for the ink jet nozzles to alter the ink drop size. A solid ink printer determines the quantity of ink delivered through the ink supply system by counting the number of whole or partial ink sticks that pass a predetermined point in the ink supply system. The counter detects a sensing element formed on an external surface of the ink stick. Exemplary detectors include a mechanical arm, or a thermistor to detect a change in the printer melt plate temperature due to a change in the cross sectional area of an ink stick being melted.

24 Claims, 26 Drawing Sheets

U.S. PATENT DOCUMENTS

| | | | | |
|---|---|---|---|---|
| 6,053,608 | A | 4/2000 | Ishii et al. | |
| 6,334,658 | B1 | 1/2002 | Suzuki | |
| 6,543,867 | B1 | 4/2003 | Jones | |
| 6,648,435 | B1 * | 11/2003 | Jones | 347/7 |
| 6,755,517 | B2 * | 6/2004 | Jones et al. | 347/99 |
| 6,783,026 | B2 | 8/2004 | Chambers et al. | |
| 2003/0146945 | A1 | 8/2003 | Inui et al. | |

FOREIGN PATENT DOCUMENTS

| | | |
|---|---|---|
| EP | 1359019 | 11/2003 |
| EP | 1359021 | 11/2003 |
| EP | 1366914 | 12/2003 |
| JP | 10081023 A * | 3/1998 |

OTHER PUBLICATIONS

Copending U.S. Patent Application No., filed concurrently herewith, entitled "Ink Consumption Determination," by James D. Buehler et al., Pub Date: Dec. 14, 2006.

Copending U.S. Patent Application No., filed concurrently herewith, entitled "Ink Level Sensing," by Scott J. Korn, Pub Date: Dec. 14, 2006.

Copending U.S. Patent Application No., filed concurrently herewith, entitled "Ink Consumption Determination," by Amin M. Godil et al., Pub Date: Dec. 14, 2006.

Copending U.S. Patent Application No., filed concurrently herewith, entitled "Ink Consumption Determination," by Brent R. Jones et al., Pub Date: Dec. 14, 2006.

* cited by examiner

INK CONSUMPTION DETERMINATION

CROSS-REFERENCE TO RELATED APPLICATION(S)

Reference is made to commonly-assigned copending U.S. patent application Ser. No. 11/149,337, filed concurrently herewith, entitled "Ink Jet Printer Performance Adjustment," by James D. Buehler et al.; copending U.S. patent application Ser. No. 11/149,336, filed concurrently herewith, entitled "Ink Consumption Determination," by James D. Buehler et al.; copending U.S. patent application Ser. No. 11/149,335, filed concurrently herewith, entitled "Ink Level Sensing," by Scott J. Korn; copending U.S. patent application Ser. No. 11/149,334, filed concurrently herewith, entitled "Ink Consumption Determination," by Amin M. Godil et al.; and copending U.S. patent application Ser. No. 11/149,333, filed concurrently herewith, entitled "Ink Consumption Determination," by Brent R. Jones et al., the disclosure(s) of which are incorporated herein.

BACKGROUND

The present invention relates to ink jet printing, and particularly to the characteristics of ink drops ejected from the individual nozzles of an ink jet printhead.

Ink jet printing includes ejecting or jetting drops of liquid ink from selected nozzles of a printhead to form an image on an image receiving surface, such as an intermediate transfer surface, or a media substrate such as paper. Some ink jet printers receive ink in its liquid form. The liquid ink is stored in containers. Other printers receive ink in a solid form.

Solid ink or phase change ink printers conventionally receive ink in a solid form and convert the ink to a liquid form for jetting onto the image receiving surface. The printer receives the solid ink either as pellets or as ink sticks in an ink feed system. With solid ink sticks, the solid ink sticks are fed by gravity, spring force, or other driver through the ink feed system toward a heater plate. The heater plate melts the solid ink into its liquid form. U.S. Pat. No. 6,840,612 for a Guide for Solid Ink Stick Feed issued Jan. 11, 2005, to Jones et al.; U.S. Pat. No. 5,734,402 for a Solid Ink Feed System, issued Mar. 31, 1998 to Rousseau et al.; and U.S. Pat. No. 5,861,903 for an Ink Feed System, issued Jan. 19, 1999, to Crawford et al. describe exemplary systems for delivering solid ink sticks into a phase change ink printer.

The ink feed system delivers the liquid ink to an ink jet printhead. The ink jet printhead contains a plurality of drop generators for ejecting drops of ink onto the image receiving surface. Each drop generator includes an ink conduit leading to an orifice or nozzle through which a drop of ink can be ejected, and an ink drop ejector for causing a drop of ink to be ejected from the ink conduit through the nozzle orifice. Activation signals delivered to each ink drop ejector cause the ejector to eject the drop of ink.

In thermal ink jet printheads, the ink drop ejectors are thermal ejectors that heat ink in the conduit to boil the ink and form a gas bubble behind the drop of ink to be ejected, forcing the drop of ink from the ink jet nozzle orifice. The thermal ejectors heat the ink in response to activation signals received at the thermal ejector.

In piezo-electric ink jet printheads, the ink drop ejectors are piezo-electric ejectors that line the ink conduit near the orifice. The piezo-electric ejectors change shape in response to an electrical activation signal to force a drop of ink from the ink jet nozzle orifice.

Various factors affect the size and trajectory of the ink drops ejected from a printhead nozzle. Among those factors are the size and shape of the nozzle opening, the responsiveness of the ink drop ejectors to particular activation signals, and the magnitude, duration, and shape of the activation signals.

In certain types of printheads, the characteristics of the ink jet drop generators may change over time or usage, so that the size of the ink drop ejected in response to a given activation signal changes over time. Such change in the ink drops may produce undesired change in the image formed on the image receiving surface. Therefore, some printers have included schemes to attempt to compensate for this change in the ink drops. Some ink jet printers incorporate an algorithm to alter the activation signals supplied to the ink drop ejectors as the printhead ages to compensate for anticipated changes to the characteristics of the ink jet drop generators, and to maintain a consistent ink drop size over time. Some printers, such as the Tektronix/Xerox Phaser 840 phase change ink printer, have an algorithm that examines the time and temperature history of the printhead, makes certain assumptions about how the characteristics of the ink jet drop generators are likely to have changed in response to that history, and alters the activation signals supplied to the ink drop ejectors based on those assumptions. Implementing such an algorithm requires an understanding of the relationship between the time and temperature history and changes in the characteristics of the ink jet nozzles.

SUMMARY

In accordance with an aspect of the apparatus and method described here, the printer controller determines the ink drop size actually ejected from the ink jet drop generators. The printer determines if the determined ink drop size meets predetermined ink drop size criteria. If the ink drop size does not meet the predetermined ink drop size criteria, such as the ink drop size is outside of a specified size range, the printer controller alters the activation signals provided to the ink drop ejectors to cause the ink drop ejectors to eject an ink drop closer in size to the predetermined ink drop criteria.

In accordance with another aspect of the present apparatus and method, the printer controller determines the size of the ink drops ejected from the ink jet drop generators by counting the number of ink drops ejected by the drop generators during a predetermined period of time, measures the amount of ink passing through the printer ink supply system during that period of time, and calculating from the number of ink drops and the measured amount of ink, the average size of the ink drops.

In accordance with another aspect of the present apparatus and method, the printer controller measures the amount of ink passing through the printer ink supply system during the predetermined period of time by counting the number of identically sized ink sticks that engage the ink stick melting heater.

In accordance with another aspect of the present apparatus and method, the printer controller counts the number of identically sized ink sticks that engage the ink stick melting heater by using a specialized detector in the printer's ink feed system to detect a specialized sensing feature in each ink stick.

In accordance with another aspect of the present apparatus and method, the printer controller counts the number of identically sized ink sticks that engage the ink stick melting heater by detecting a specialized sensing feature on an outer surface of each ink stick.

In accordance with another aspect of the present apparatus and method, the printer controller counts the number of identically sized ink sticks that engage the ink stick melting heater by using a specialized ink stick sensing feature formed at a predetermined location on an exterior surface of each ink stick to engage a movable detector element in an ink stick feed channel of the ink feed system.

In accordance with another aspect of the present apparatus and method, the printer controller counts the number of identically sized ink sticks that engage the ink stick melting heater by detecting a temperature change at the ink stick melting heater that corresponds to a specialized feature formed in the ink stick.

In accordance with yet another aspect of the present apparatus and method, each ink stick includes multiple specialized ink stick sensing features, and the printer detects portions of ink sticks that engage the ink stick melting heater.

DETAILED DESCRIPTION

Figure 1:
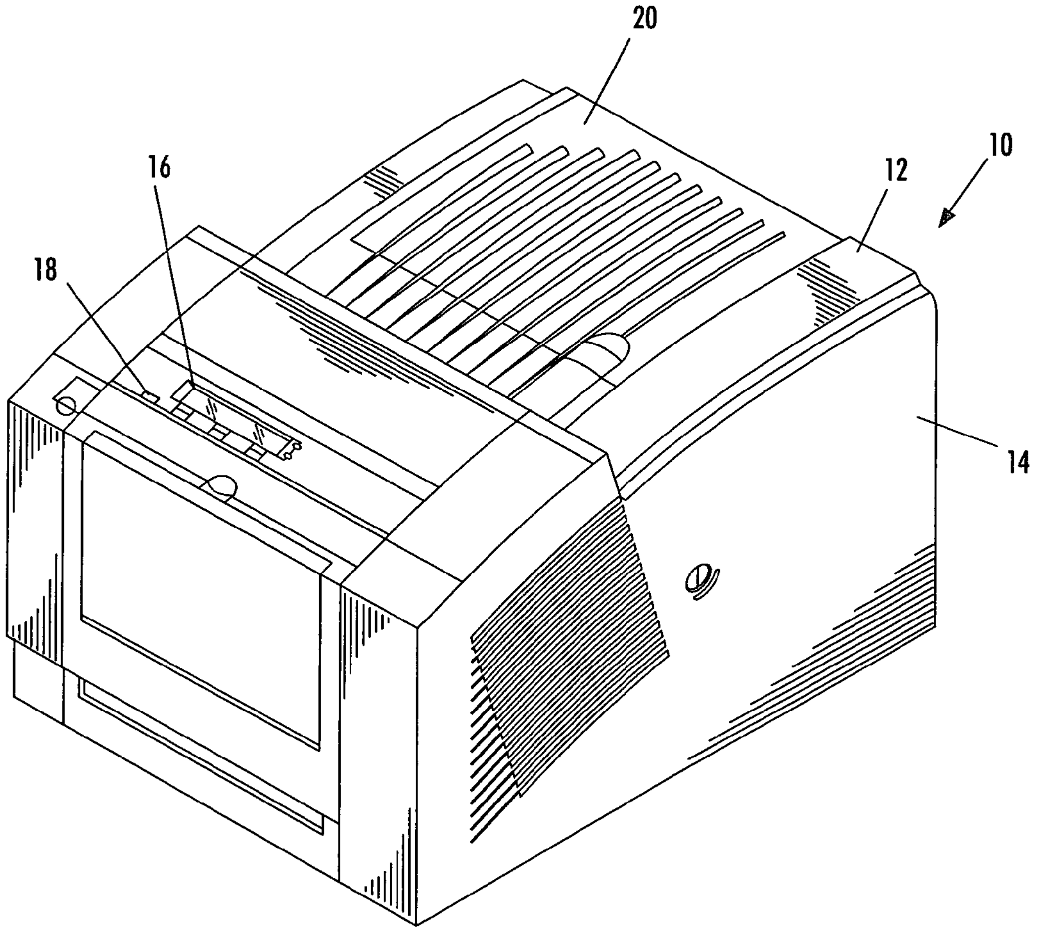
FIG. 1 is a perspective view of a phase change printer with the printer ink access cover closed.
Figure 2:
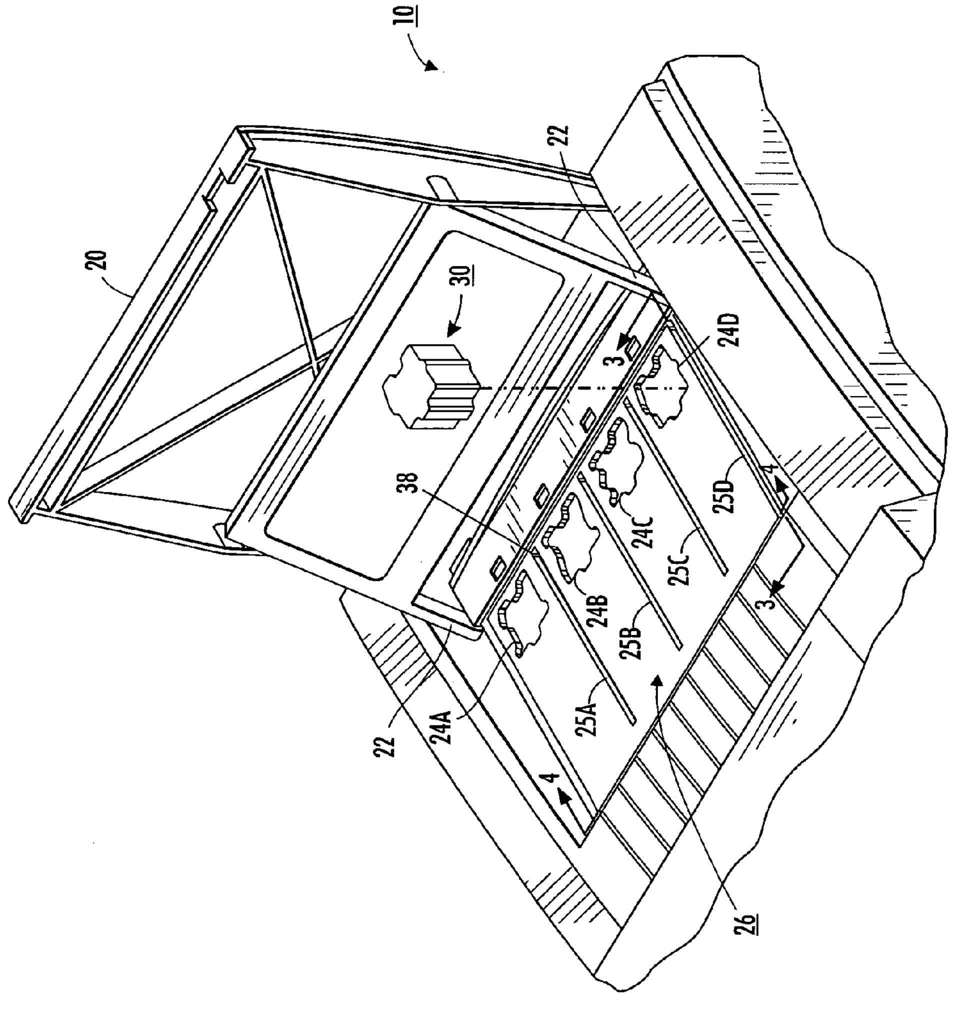
FIG. 2 is an enlarged partial top perspective view of the phase change printer with the ink access cover open, showing a solid ink stick in position to be loaded into a feed channel.

FIG. 1 shows a solid ink phase change ink jet printer 10 that includes an outer housing having a top surface 12 and side surfaces 14. A user interface, such as a front panel display screen 16, displays information concerning the status of the printer, and user instructions. Buttons 18 or other control elements for controlling operation of the printer are adjacent the user interface display screen, or may be at other locations on the printer. An ink jet printing mechanism 11 (FIG. 6) is contained inside the housing. Such a printing mechanism is described in U.S. Pat. No. 5,805,191, entitled Surface Application System, to Jones et al., and U.S. Pat. No. 5,455,604, entitled Ink Jet Printer Architecture and Method, to Adams et al. An ink delivery system delivers ink to the printing mechanism. The ink delivery system is contained under the top surface of the printer housing. The top surface of the housing includes a hinged ink access cover 20 that opens, as shown in FIG. 2, to provide the user access to the ink delivery system.

Figure 3:
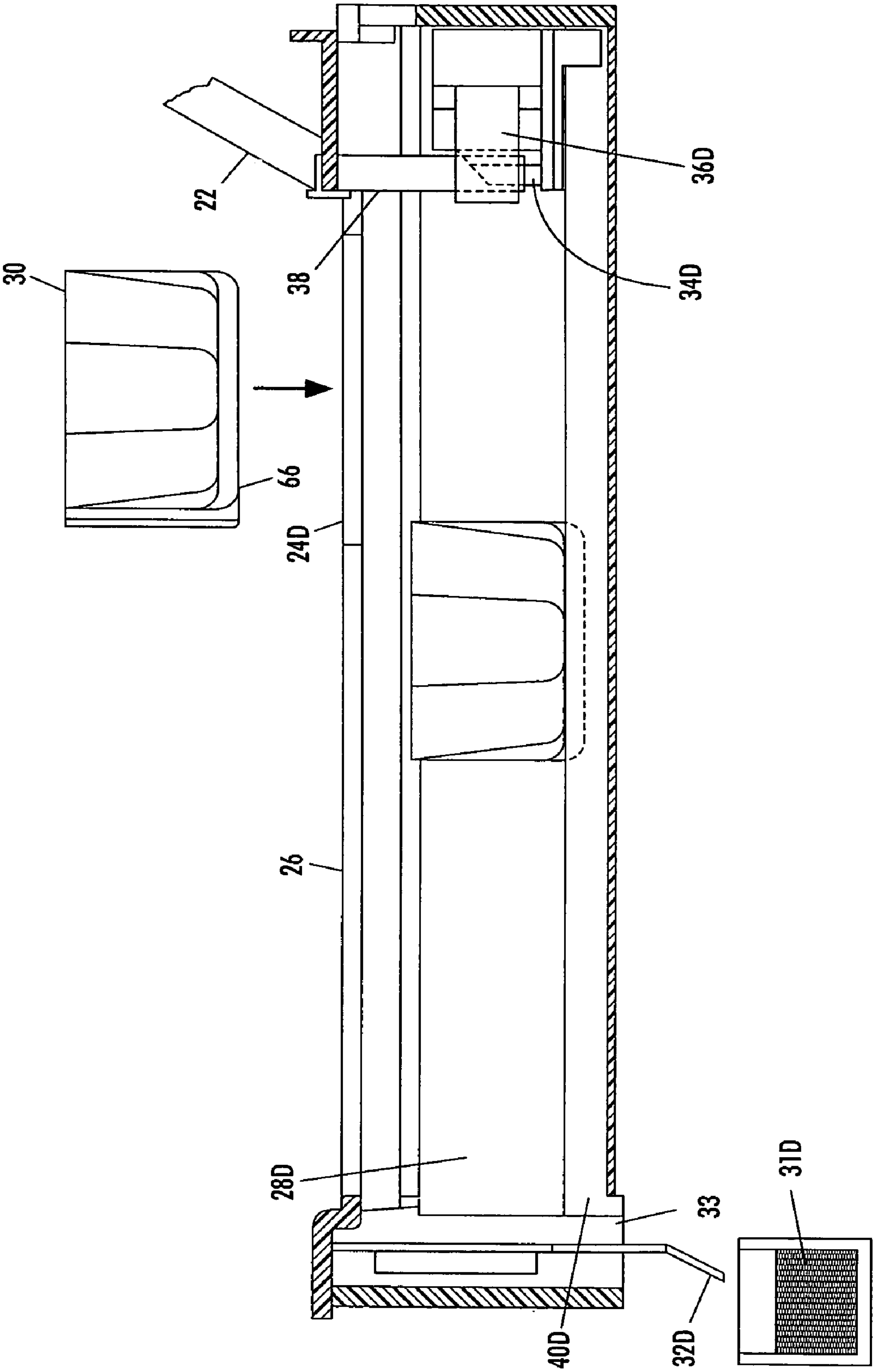
FIG. 3 is a side sectional view of one embodiment of a feed channel of a solid ink feed system, taken along line 3-3 of FIG. 2.

In the exemplary printer shown, the ink access cover 20 is attached to an ink load linkage element 22 so that when the printer ink access cover 20 is raised, the ink load linkage 22 slides and pivots to an ink load position. As seen in FIG. 2, opening the ink access cover reveals a key plate 26 having keyed openings 24A, 24B, 24C, 24D. Each keyed opening 24A, 24B, 24C, 24D provides access to an insertion end of one of several individual feed channels 28A, 28B, 28C, 28D of the solid ink delivery system (see FIGS. 3, 4 and 5).

Figure 4:
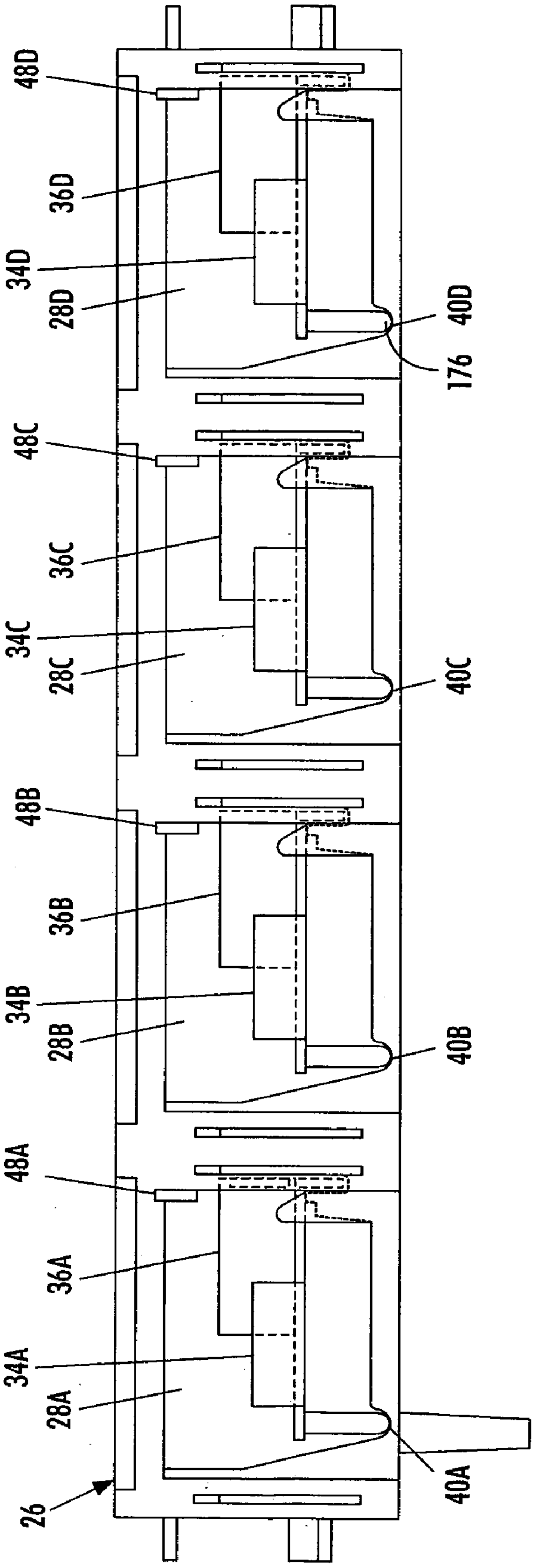
FIG. 4 is a sectional view of an embodiment of the ink stick feed system, taken along line 4-4 of FIG. 2.
Figure 5:
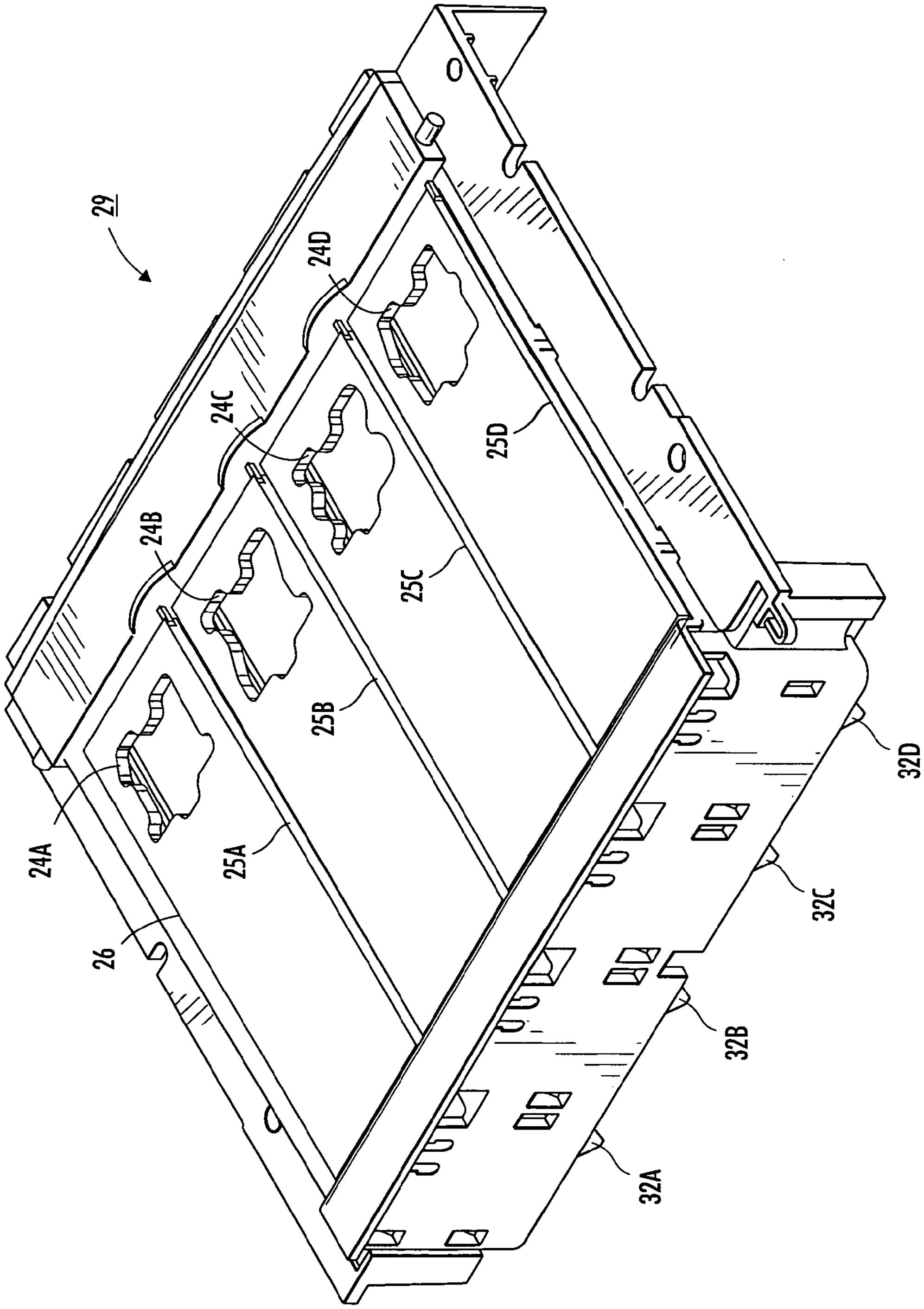
FIG. 5 is a perspective view of an embodiment of the ink stick feed system.
Figure 6:
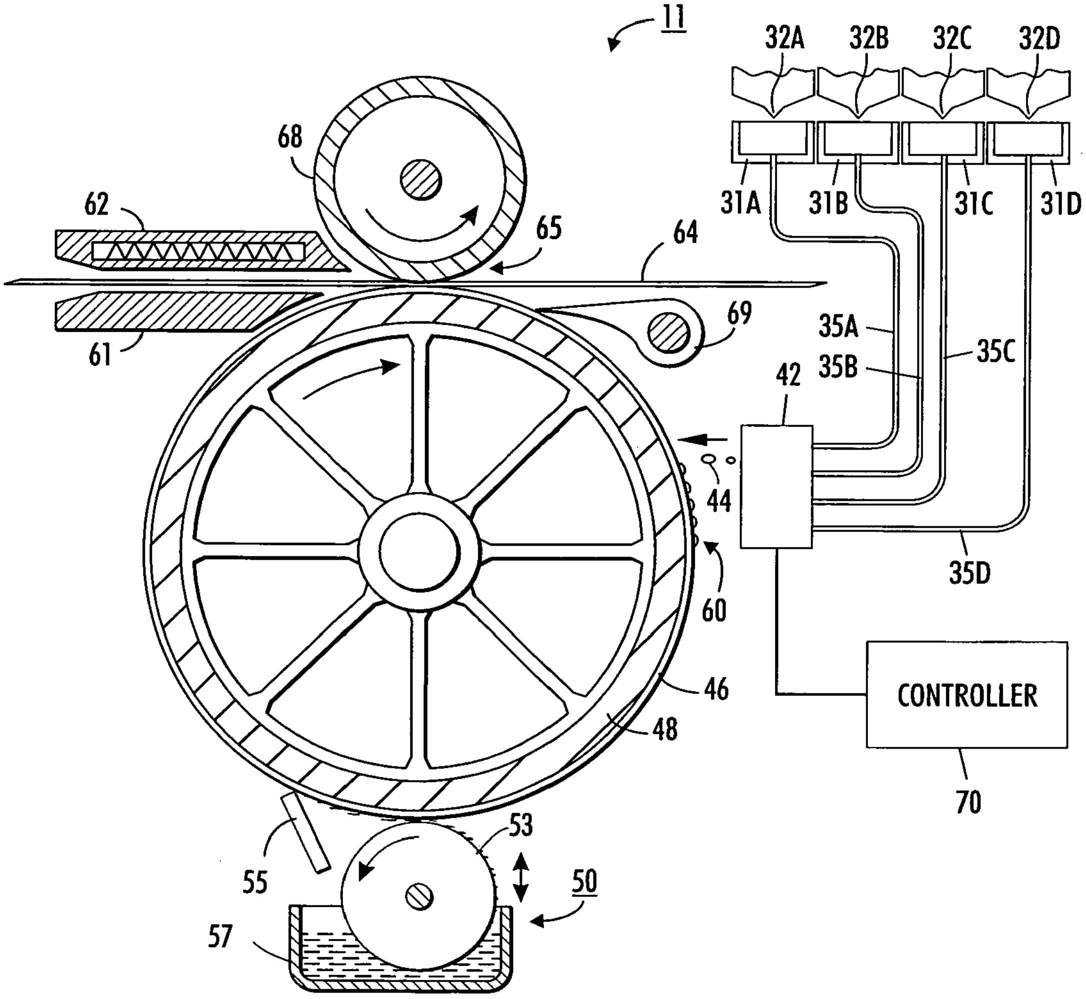
FIG. 6 is a schematic block diagram of an embodiment of an ink jet printing mechanism.

Each feed channel 28A, 28B, 28C, 28D delivers ink sticks 30 of one particular color to a corresponding melter, such as a melt element or melt plate 32A, 32B, 32C, 32D. Each feed channel has a longitudinal feed direction from the insertion end of the feed channel to the melt end of the feed channel adjacent the melt plate. The melt plate melts the solid ink stick into a liquid form. The melted ink flows along the face of the melt plate and drips through a gap 33 between the melt end of the feed channel and the melt plate (FIG. 3), and into a corresponding liquid ink reservoir 31A, 31B, 31C, 31D (FIG. 6). Each reservoir corresponds to one of the melt plates 32A, 32B, 32C, 32D, which in turn corresponds to one of the ink stick feed channels 28A, 28B, 28C, 28D. Each feed channel in the exemplary embodiment illustrated includes a push block 34A, 34B, 34C, 34D driven by a driving force or element, such as a constant force spring (36A, 36B, 36C, 36D), to conduct the individual ink sticks along the length of the longitudinal feed channel toward the melt plates that are at the melt end of each feed channel. The tension of the constant force spring drives the push block toward the melt end of the feed channel. The ink load linkage 22 is coupled to a yoke 38, which is attached to the constant force spring mounted in the push block. Each yoke extends through a corresponding slot 25A, 25B, 25C, 25D in the key plate 26. The attachment to the ink load linkage 22 pulls the push blocks 34A, 34B, 34C, 34D toward the insertion end of the feed channel when the ink access cover 20 is raised to reveal the key plate 26. The constant force spring can be a flat spring with its face oriented along a substantially vertical axis. FIG. 4 is a cross-sectional view of the set of feed channels 28A, 28B, 28C, 28D of the ink delivery system. A guide rail 40A, 40B, 40C, 40D and a secondary guide surface 48A, 48B, 48C, 48D guide the ink sticks as they travel or are conducted along the feed channel. FIG. 5 shows the solid ink feed system 29 with the heaters and other electronics controlling the operation of the melt plates 32A, 32B, 32C, 32D. Persons familiar with the art will identify that other orientations of the ink stick feed channel may be used, and that other techniques are available to move the ink sticks from the insertion end of the feed channel to the melt end.

A color printer may use four colors of ink (yellow, cyan, magenta, and black). Ink sticks 30 of each color are delivered through a corresponding individual one of the solid ink feed channels 28A, 28B, 28C, 28D. The operator of the printer exercises cares to avoid inserting ink sticks of one color into a feed channel for a different color. Ink sticks may be so saturated with color dye or pigment that it may be difficult for a printer user to tell by color alone which color is which. Cyan, magenta, and black ink sticks in particular can be difficult to distinguish visually based on color appearance. The key plate 26 has keyed openings 24A, 24B, 24C, 24D to aid the printer user in ensuring that only ink sticks of the proper color are inserted into each feed channel. Each keyed opening of the key plate has a unique shape. The ink sticks 30 of the color for that feed channel have a shape corresponding to the shape of the keyed opening. The keyed openings and corresponding ink stick shapes exclude from each ink feed channel ink sticks of all colors except the ink sticks of the proper color for that feed channel of that particular printer.

FIG. 6 is a schematic block diagram of an embodiment of an ink jet printing mechanism 11. The printing mechanism includes a printhead 42 that is appropriately supported for stationary or moving utilization to emit drops 44 of ink onto an intermediate transfer surface 46 applied to a supporting surface of a print drum 48. The ink is supplied from the ink reservoirs 31A, 31B, 31C, 31D of the ink supply system through liquid ink conduits 35A, 35B, 35C, 35D that connect the ink reservoirs with the printhead 42. The intermediate transfer surface 46 can be a liquid layer such as a functional oil that can be applied by contact with an applicator such as a roller 53 of an applicator assembly 50. By way of illustrative example, the applicator assembly 50 can include a metering blade 55 and a reservoir 57. The applicator assembly 50 can be configured for selective engagement with the print drum 48.

The exemplary printing mechanism 11 further includes a substrate guide 61 and a media preheater 62 that guides a print media substrate 64, such as paper, through a nip 65 formed between opposing actuated surfaces of a roller 68 and the intermediate transfer surface 46 supported by the print drum 48. Stripper fingers or a stripper edge 69 can be movably mounted to assist in removing the print medium substrate 64 from the intermediate transfer surface 46 after an image 60 comprising deposited ink drops is transferred to the print medium substrate 64.

In certain ink jet printers, the ink drop generators of the printhead may eject drops of ink directly onto a print media substrate, without using an intermediate transfer surface.

Figure 7:
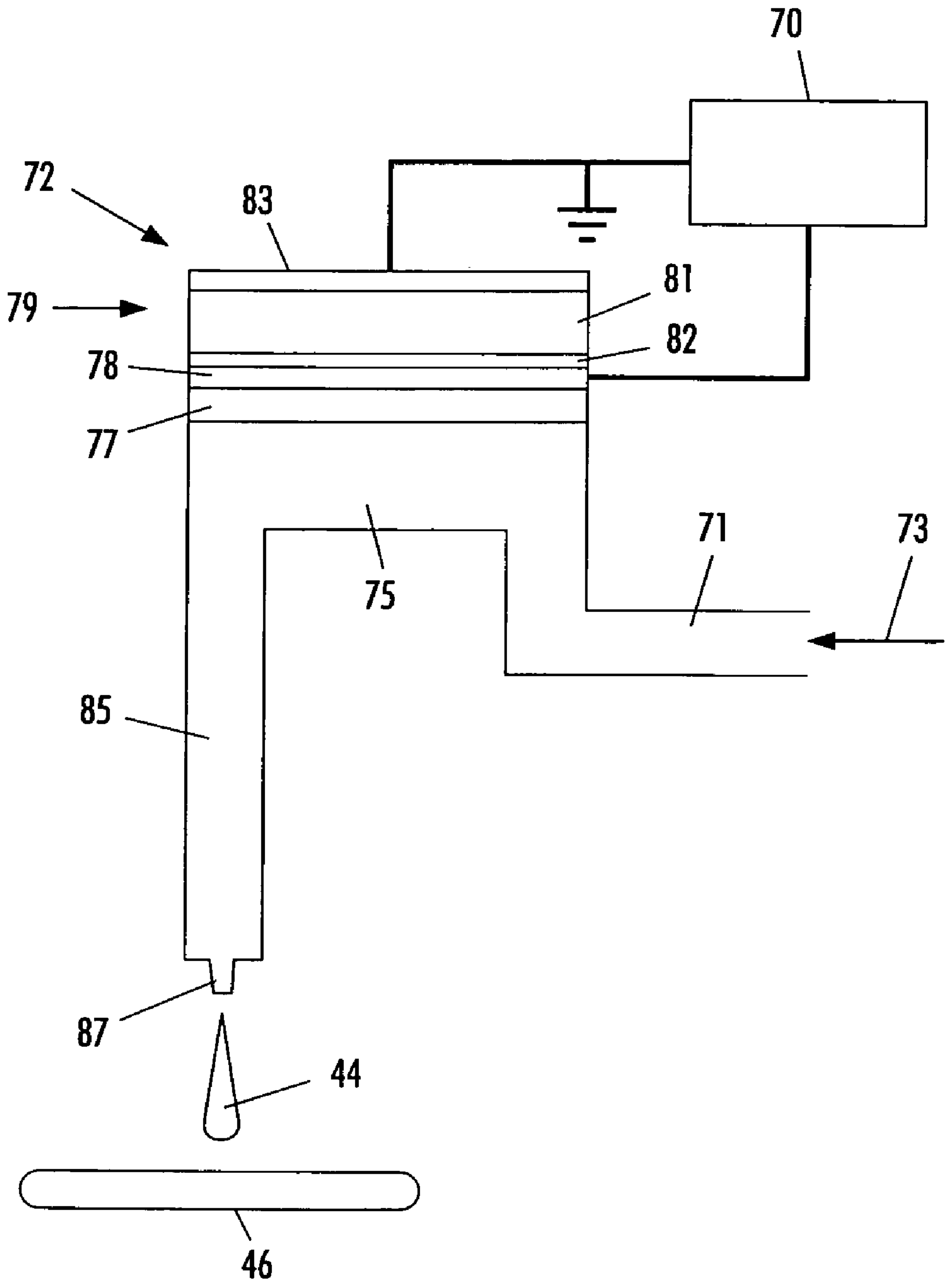
FIG. 7 is a schematic block diagram of an embodiment of a drop generator portion of an ink jet printing mechanism.

A print controller 70 is operatively connected to the printhead 42. The print controller transmits activation signals to the printhead to cause selected individual drop generators of the printhead to eject drops of ink 44. The activation signals energize the individual drop generators of the printhead. FIG. 7 is a schematic block diagram of an embodiment of a drop generator portion 72 of the printhead for generating drops of ink 44. An exemplary printhead includes a multiplicity of such drop generators 72. The controller 70 selectively energizes the drop generators by providing a respective ejector activation signal to each drop generator. Each drop generator employs an ink drop ejector that responds to the ejector activation signal. Exemplary ink drop ejectors include piezoelectric transducers, and in particular, ceramic piezoelectric transducers. As other examples, each of the drop generators can employ a shear-mode transducer, an annular constrictive transducer, an electrostrictive transducer, an electromagnetic transducer, or a magneto restrictive transducer.

The drop generator 72 includes an inlet channel 71 that receives ink 73 from a manifold, reservoir or other ink containing structure. In an example, the inlet channel 71 is connected to one of the liquid ink conduits 35A, 35B, 35C, 35D. The ink 73 flows into a pressure or pump chamber 75 that is bounded on one side, for example, by a flexible diaphragm 77. A thin-film interconnect structure 78 is attached to the flexible diaphragm, for example so as to overlie the pressure chamber 75. An electromechanical transducer 79 is attached to the thin film interconnect structure 78. The electromechanical transducer 79 can be a piezoelectric transducer that includes a piezo element 81 disposed for example between electrodes 82 and 83 that receive drop firing and non-firing activation signals from the controller 70 via the thin-film interconnect structure 78, for example. The electrode 83 is connected to ground in common with the controller 70, while the electrode 82 is actively driven to actuate the electromechanical transducer 81 through the interconnect structure 78. Actuation of the electromechanical transducer 79 causes ink to flow from the pressure chamber 75 to a drop forming outlet channel 85, from which an ink drop 44 is emitted toward a receiver medium that can be the transfer surface 46, for example. The outlet channel 85 can include a nozzle or orifice 87.

Many factors influence the characteristics of the individual ink drops 44 ejected from the nozzle 87. One ink drop characteristic of note is the size of the ink drop, which may be identified as the mass of ink contained in the ink drop. Among the factors influencing the characteristics of the individual ink drops are the diameter of the nozzle opening, the physical characteristics of the electromechanical transducer 79, the magnitude of the ejector activation signal the controller 70 applies to the electromechanical transducer 79, and the duration of the ejector activation signal the controller 70 applies to the electromechanical transducer 79.

In certain printers, changes to the printhead over time or usage cause the characteristics of the ink drops ejected from the nozzles 87 to change. For example, during use, corrosion of the printhead face may change the diameter of the nozzle opening. A process of determining the actual size of the ink drops ejected through the nozzles 87 of the printhead and then compensating for changes in the ink drop size allows the printer to maintain a consistent ink drop size over time.

Figure 8:
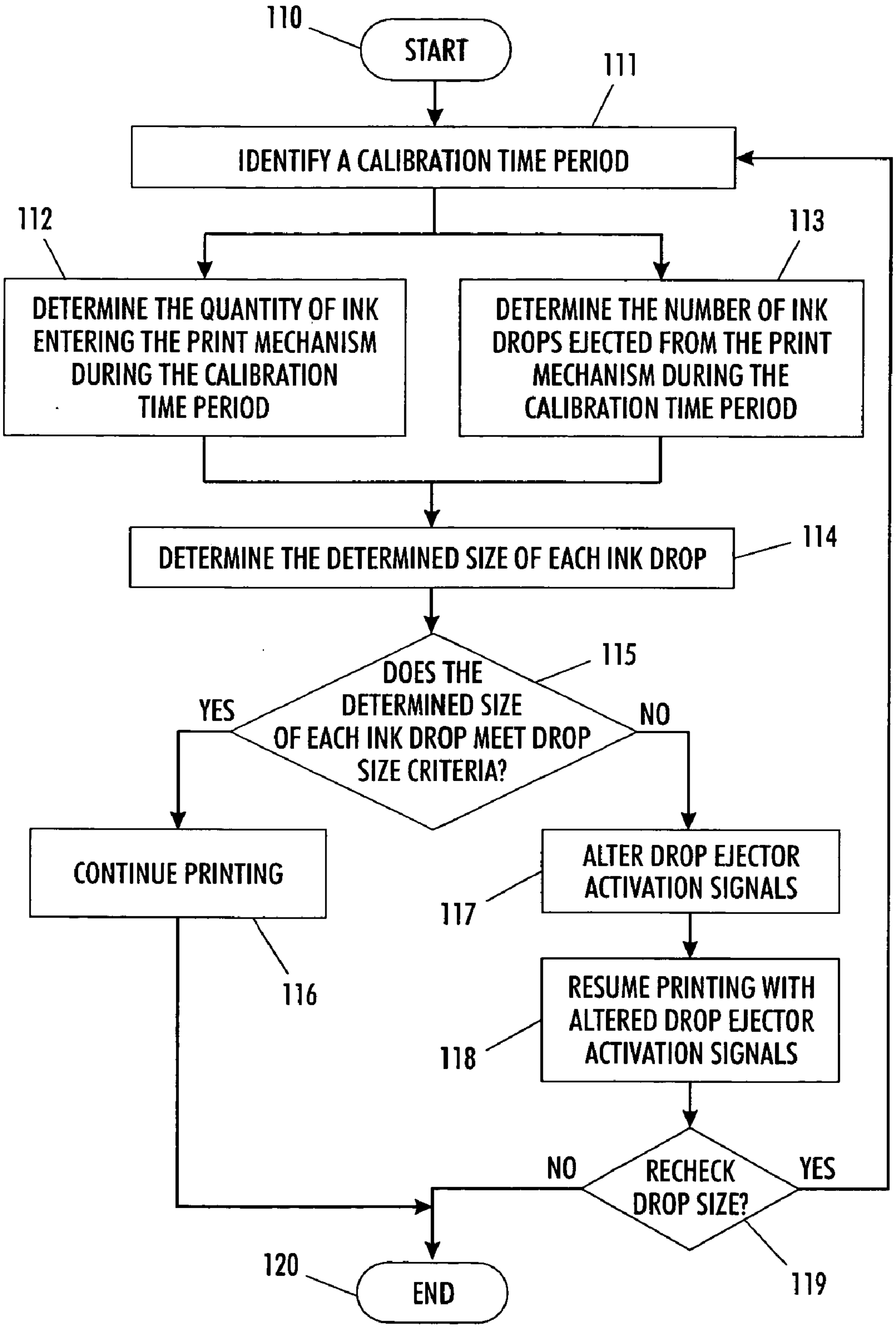
FIG. 8 is a flowchart of an exemplary process for ink drop size compensation.

FIG. 8 illustrates an exemplary process for determining the drop size or mass of an ink drop ejected from the drop generators of the printhead, and determining if the ink drop size meets predetermined ink drop criteria. If the ink drop size does not meet the predetermined ink drop criteria, such as the ink drop size is outside of a specified size range, the printer controller may calibrate the drop generator ejectors to return the ink drop to the predetermined ink drop criteria. In an example, the printer controller alters the activation signals provided to the ink drop ejectors to cause the ink drop ejectors to eject an ink drop closer in size to the predetermined ink drop criteria.

The calibration process begins 110, and identifies a specified period of time 111 during which the calibration process is to take place. During that specified calibration time period, the printer determines 112 the quantity of ink entering the print mechanism 42, and simultaneously determines 113 the number of ink drops ejected from the printhead during the same specified calibration time. During that calibration time, the controller transmits to the drop generators of the printhead, first drop ejector activation signals having first signal characteristics, including a first predetermined magnitude (i.e., voltage), a first predetermined duration and a first predetermined shape. Many printers currently count the number of ink drops ejected from the printhead for various purposes. Therefore, the ink drop count information can be made available to the printer controller. From the determined quantity of ink entering the printhead and the determined number of ink drops ejected from the printhead, the size of ink each ink drop is determined.

In an example, the mass of the ink entering the print mechanism during the specified calibration time is determined, from which the average mass of each ink drop is determined 114 by dividing the mass of the ink entering the printhead by the number of drops ejected from the printhead during that specified calibration time. The mass of ink entering the print mechanism is determined by determining the mass of the ink passing a particular point in the ink delivery system of the printer. The determined ink drop size is compared with a predetermined drop size criteria 115. If the determined ink drop size meets the ink drop size criteria, the controller continues to send 116 to the drop generator the first ejector activation signals of the same magnitude and duration. However, if the determined ink drop size does not meet the drop size criteria, such as the determined ink drop size is too large or too small, the controller alters 117 the ejector activation signal to cause the drop generator to emit a larger or smaller ink drop in accordance with the desired direction to move the ink drop size toward the drop size criteria. The controller then transmits to the drop generators of the printhead second ejector activation signals, having second signal characteristics, including a second predetermined magnitude (i.e., voltage), a second predetermined duration, and a second predetermined shape. For example, if the determined ink drop size is too large, lowering the voltage of the ejector activation signal or reducing the duration of the ejector activation signal may reduce the size of the ejected ink drop. Thus, the printer controller transmits 118 to the drop ejectors second ejector activation signals having second characteristics, including a second predetermined magnitude and a second predetermined duration. At least one characteristic of the second ejector activation signals is different from the corresponding characteristic of the first ink nozzle activation signals. The details of the changes to the characteristics of the ink nozzle activation signals and how those changes affect the drops ejected by the drop generators of a particular printhead depend on the specific design and manufacture of the printhead. The calibration can be rechecked 119 with the altered ejector activation signals to determine if the alteration brought the ink drop size to within the ink drop size criteria. If recheck is determined not to be necessary, the program ends 120 for the time being.

In certain circumstances, and with certain printheads, the size of the ink drop ejected by a drop generator in response to a drop ejector activation signal may also depend on certain variable factors, such as whether the particular drop generator also ejected a drop during the immediately preceding clock cycle, or on another aspect of the drop generator's drop ejection history. Therefore, the printer controller may keep separate counts of the numbers of ink drops ejected in conjunction with each variable factor. These factors may be determined empirically for a particular printhead type. For example, the printer controller may keep separate counts of the number of ink drops ejected in which the same drop generator ejected a drop in the immediately preceding clock cycle, and the number of ink drops ejected in which the same drop generator did not eject a drop in the immediately preceding clock cycle. The printer controller may then factor this additional information into its determination of whether the determined ink drop size meets the ink drop size criteria, and, if the determined ink drop size does not meet the ink drop size criteria, how to alter the ejector activation signals to produce the appropriate second ejector activation signals.

The calibration process can be performed even though the precise ink ejected from the ink drop generators is not precisely the same ink as that measured entering the printhead during the specified period of time for the calibration process. If the ink passing through the ink delivery system is consistent in density, and is continuously fed through the system, measuring the quantity of ink passing through a segment of the ink feed mechanism is equivalent to measuring the quantity of ink entering the printhead.

The determination of ink drop size 114 may account for certain printer actions that use ink without ejecting ink drops during a printing operation. For example, nozzle purging (to dislodge clogs) or other printhead maintenance functions may consume some ink in actions that the controller does not record as ejected ink drops. The printer controller may record the number of such actions, and use estimates of the amount of ink consumed in each such action to further the accuracy of determining the actual size of ejected ink drops. In another example, the determination of ink drop size (the calibration time period) may take place over a time when the printer does not engage in ink-consuming non-printing operations.

The printer may also avoid calculating an average ink drop size when the printer is turned off and then on again. In some circumstances, the liquid ink reservoirs 31A, 31B, 31C, 31D are emptied of their contents into a waste container when the printer is turned off and then turned on again.

A technique for determining the quantity of ink entering the print mechanism during the calibration period is to determine the quantity of ink that passes through the ink delivery system. In a solid ink printing system that receives ink in the form of solid ink sticks formed of solid ink material, the ink sticks are counted in the ink stick feed channel to determine the quantity of ink that passes through the ink delivery system. The ink sticks are counted as they pass a predetermined point in the ink stick feed channel. The ink sticks may be counted as they engage the ink stick melt plate 32A, 32B, 32C, 32D, or somewhat before encountering the melt plate.

The ink sticks passing through any one individual ink stick feed channel are identical to one another in shape and mass. Tight manufacturing tolerances for the ink sticks ensure that the ink sticks are substantially identical in mass, so that counting ink sticks yields an accurate measure of the mass of ink supplied through the ink supply system.

Figure 9:
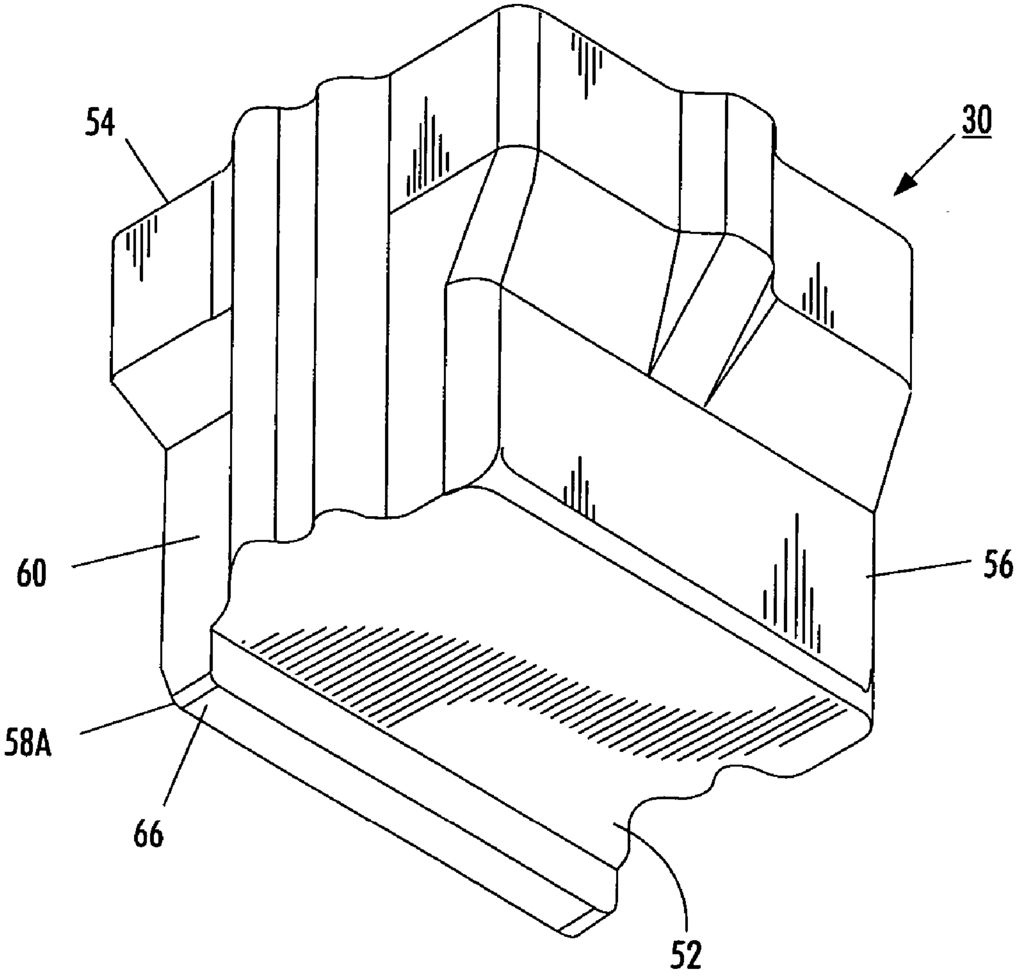
FIG. 9 is a perspective view of an exemplary ink stick for use in the ink stick feed system of FIGS. 2-5.

An exemplary ink stick for use in the ink feed system of the printer of FIGS. 1-6 is shown in perspective in FIG. 9. An exemplary ink stick is described in U.S. Pat. No. 6,840,612 on a Guide for Solid Ink Stick Feed, issued to Brent R. Jones and Frederick T. Mattern, the contents of which patent are here incorporated by reference. The ink stick illustrated is formed of a three dimensional body of ink stick material having a plurality of external surfaces. In an example, the ink stick material is substantially uniform in mass density throughout the ink stick body. In an example, the ink stick body has a bottom, represented by a general bottom external surface 52, a top, represented by a general top external surface 54, and sides, represented by two general lateral side external surfaces 56 and two end external surfaces 60. The external surfaces of the ink stick body need not be flat, nor need they be parallel or perpendicular one another. However, these descriptions will aid the reader in visualizing the core ink stick structure, even though the external surfaces may have three dimensional topography, or be angled with respect to one another.

The ink stick includes guide means for guiding the ink stick as the ink stick travels or is conducted along a feed channel 28A, 28B, 28C, 28D of the solid ink feed system. A first guide element 66 formed in the ink stick body forms one portion of the ink stick guide means. In an example, the first ink stick guide element 66 is laterally offset from the lateral center of gravity of the ink stick body. In this exemplary embodiment, the first guide element 66 is adjacent one of the lateral sides of the ink stick body. In the illustrated embodiment, the first ink stick guide element 66 is formed in the ink stick body as a lower ink stick guide element 66 substantially below the vertical center of gravity. In the embodiment illustrated in FIG. 9, the lower ink stick guide element is formed in the bottom external surface 52 of the ink stick body, and in particular is formed as a protrusion from the bottom external surface of the ink stick body. This protruding guide element is formed at or near a first lateral edge 58A of the bottom external surface. The guide element has a lateral dimension of approximately 0.12 inches (3.0 mm) and protrudes approximately 0.08-0.2 inches (2.0-5.0 mm) from the bottom external surface of the ink stick body.

Figure 10:
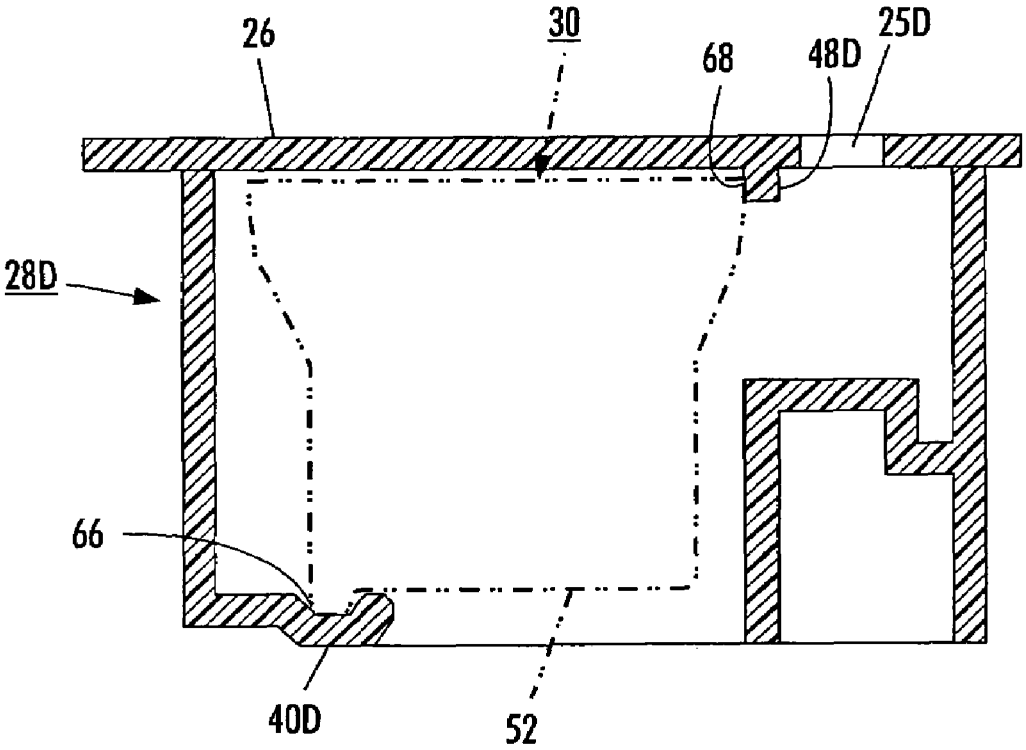
FIG. 10 is a cross-sectional view of an ink stick feed channel of the ink stick feed system of FIGS. 2-5.

FIG. 10 shows a cross sectional view of a particular exemplary embodiment of the longitudinal feed channel 28D of the solid ink feed system. The feed channel includes a feed channel guide rail 40D positioned in a lower portion of the feed channel. This feed channel guide rail 40D provides feed system guide means for guiding the ink stick 30 in the feed channel. The first ink stick guide element 66 interacts with a first portion of the feed channel, and in particular the feed channel guide rail 40D, to guide the ink stick along the feed channel 28D. The feed channel guide rail 40D of the solid ink feed system and the first guide element 66 formed in the ink stick body are compatible with one another, and for example, have complementary shapes. The complementary shapes allow the lower guide element 66 of the ink stick body to slidingly engage the feed channel guide rail of the ink stick feed channel.

The width of the feed channel guide rail is substantially less than the width of the feed channel. A majority of the bottom of the feed channel is recessed or open, so that it does not contact the bottom surface 52 of the ink stick 30. The recessed or open bottom of the feed channel allows flakes or chips of the ink stick material to fall away, so that such flakes or chips do not interfere with the sliding movement of the ink stick along the feed channel. The guide rail encompasses less than 30%, and particularly 5%-25%, and more particularly approximately 15% of the width of the feed channel. Other ink stick guide systems can be used, such as U.S. Pat. No. 6,840,613 on a Guide for Solid Ink Stick Feed, issued to Brent R. Jones.

As noted above, counting the number of ink sticks passing through the ink stick delivery system during a predetermined calibration time period is a means for determining the quantity (mass) of ink entering the print mechanism during that calibration time period. In an example, such counting is performed by counting the number of ink sticks that pass a predetermined location in an individual ink stick feed channel of the ink delivery system. The detector determines when a particular portion of an ink stick passes the predetermined location in the ink feed channel. The detector then determines when a corresponding portion of an identical ink stick following the first ink stick passes the same location. The ink delivery system includes apparatus having a detector that detects a sensing feature in each ink stick as the ink stick travels or is conducted past the predetermined location in the ink stick feed channel. The ink stick sensing features engages the detector to record an ink stick count as the ink stick sensing element passes the detector.

The ink sticks may be counted using a mechanical counting system. For example, each ink stick may be formed with a sensing element that engages a movable mechanical counting mechanism in the ink feed channel. In an alternative, an electronic sensing element can be attached to an outer surface of the ink stick, or embedded in the ink stick. In another alternative, an optical detector can be configured to sense a sensing element formed in, or attached to, the ink stick. An electronic counting system in or adjacent the ink stick feed channel may detect the presence of the electronic sensing element. An optical system may include a light source adjacent the ink stick feed channel, and a light sensor also adjacent the ink stick feed channel. A spot of fluorescent paint or other coloring on an external surface of the ink stick may be used to reflect light from the light source as the ink stick passes. The light sensor detects the reflection, so that the passing ink stick can be counted.

Figure 11:
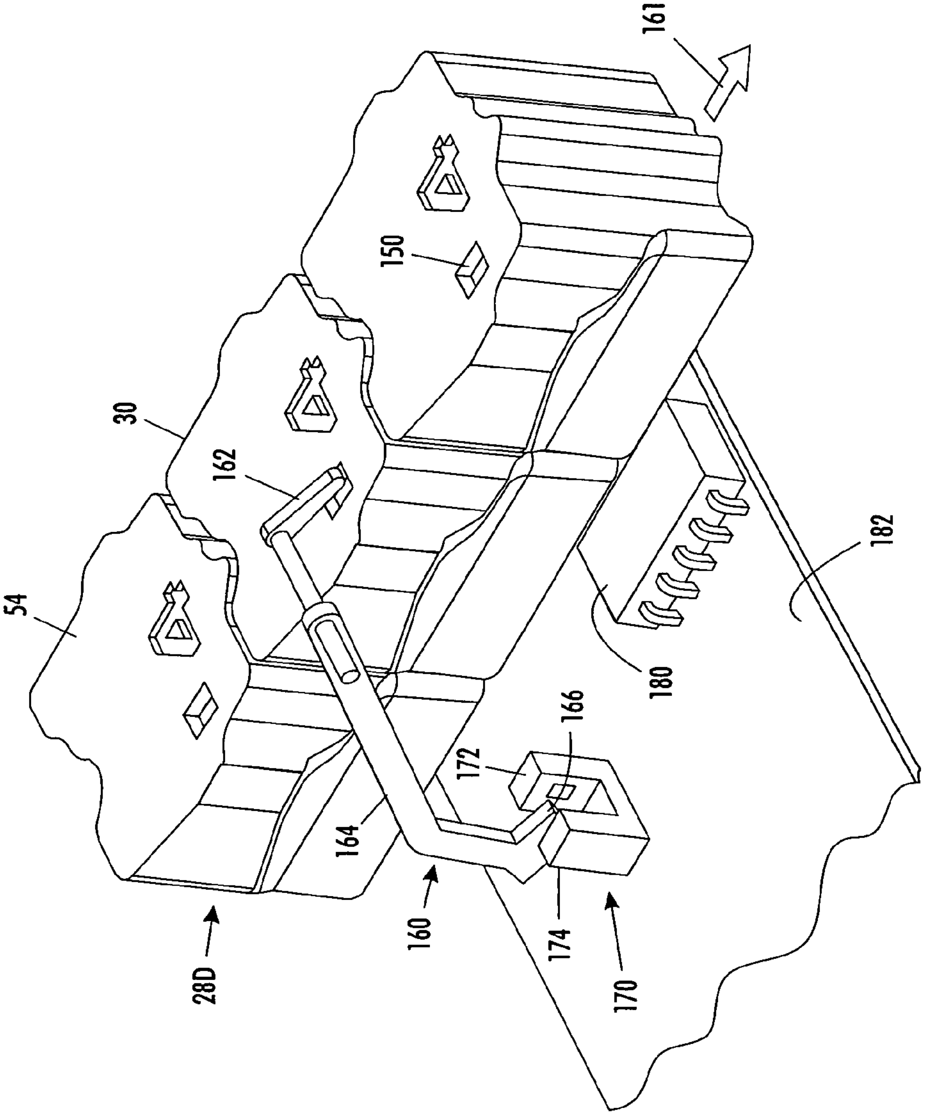
FIG. 11 is a stylized perspective view of a portion of an ink stick feed channel with an embodiment of an ink stick counting system.
Figure 12:
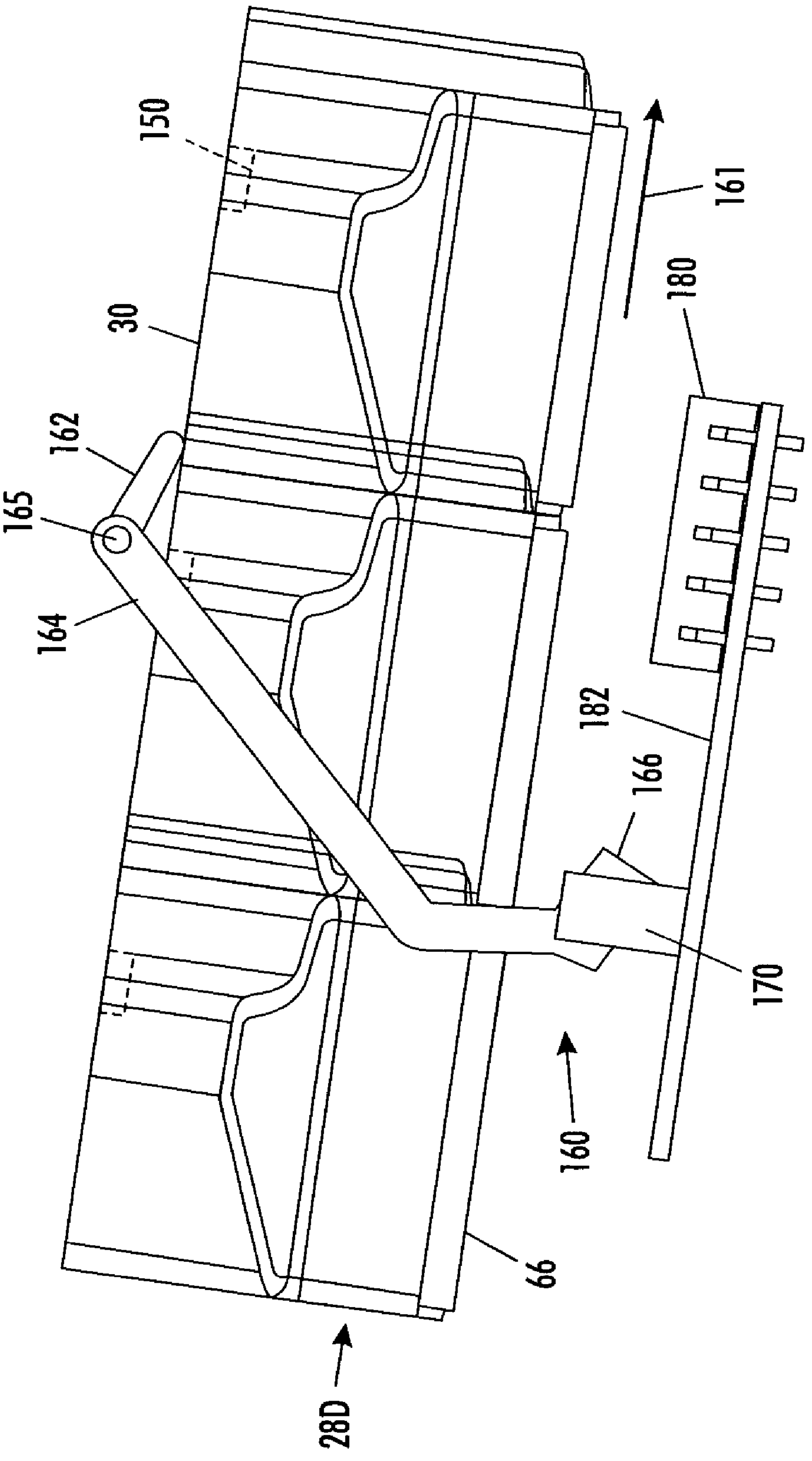
FIG. 12 is an elevation view of a portion of the ink stick feed channel of FIG. 11.
Figure 13:
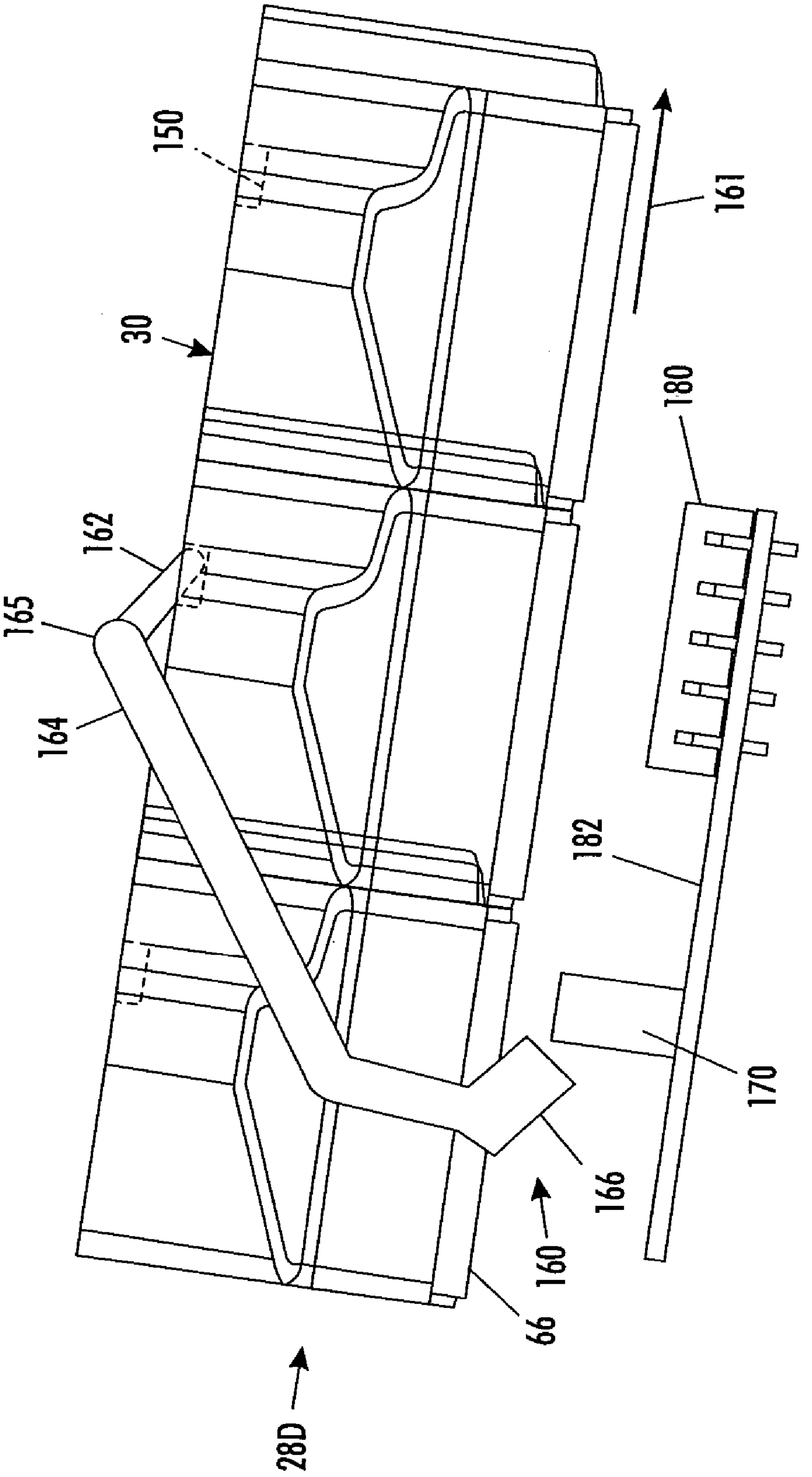
FIG. 13 is another view of the portion of the ink stick feed channel of FIG. 11.
Figure 14:
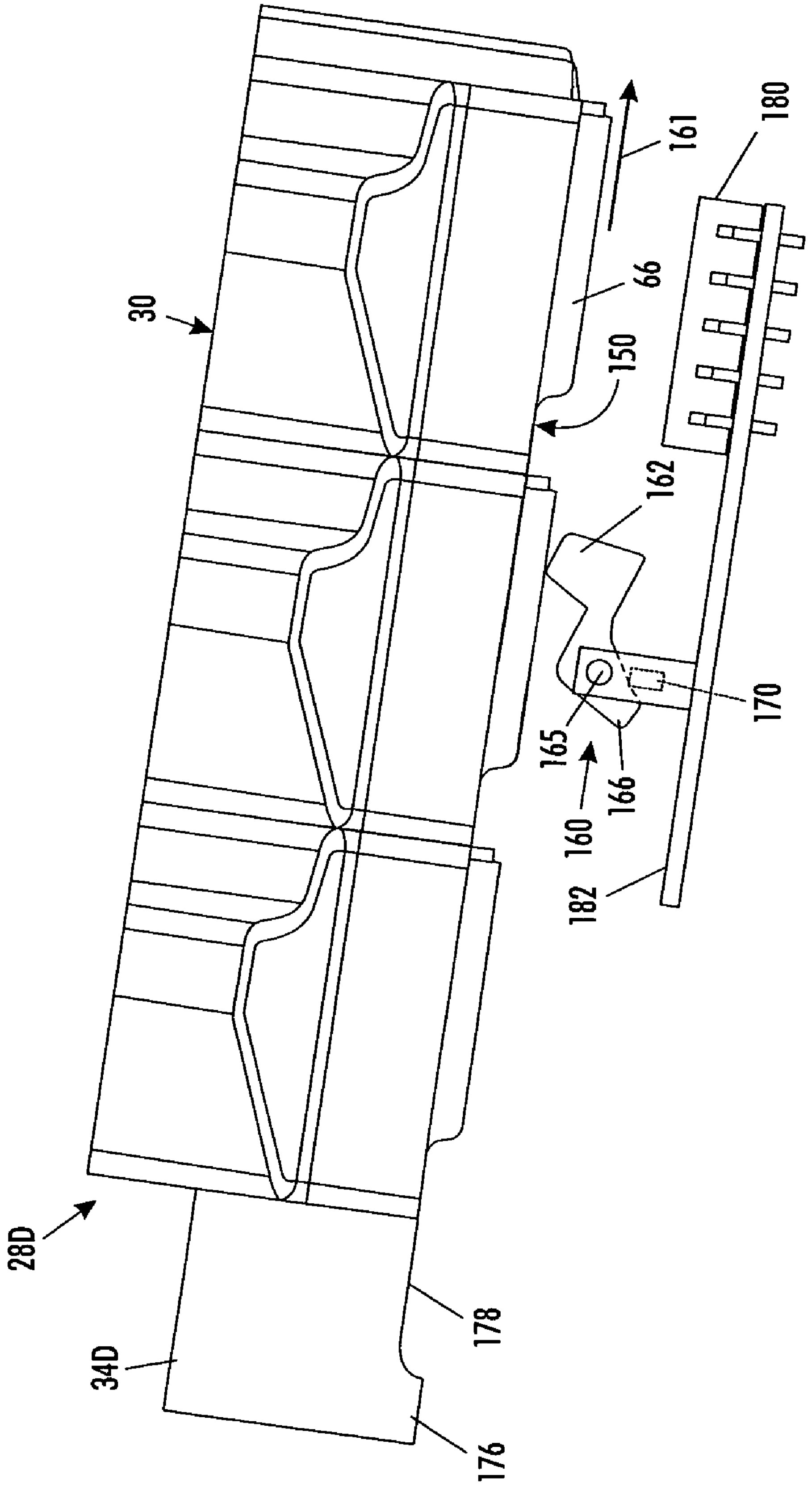
FIG. 14 is a stylized elevation view of a portion of an ink stick feed channel with another embodiment of an ink stick counting system.
Figure 15:
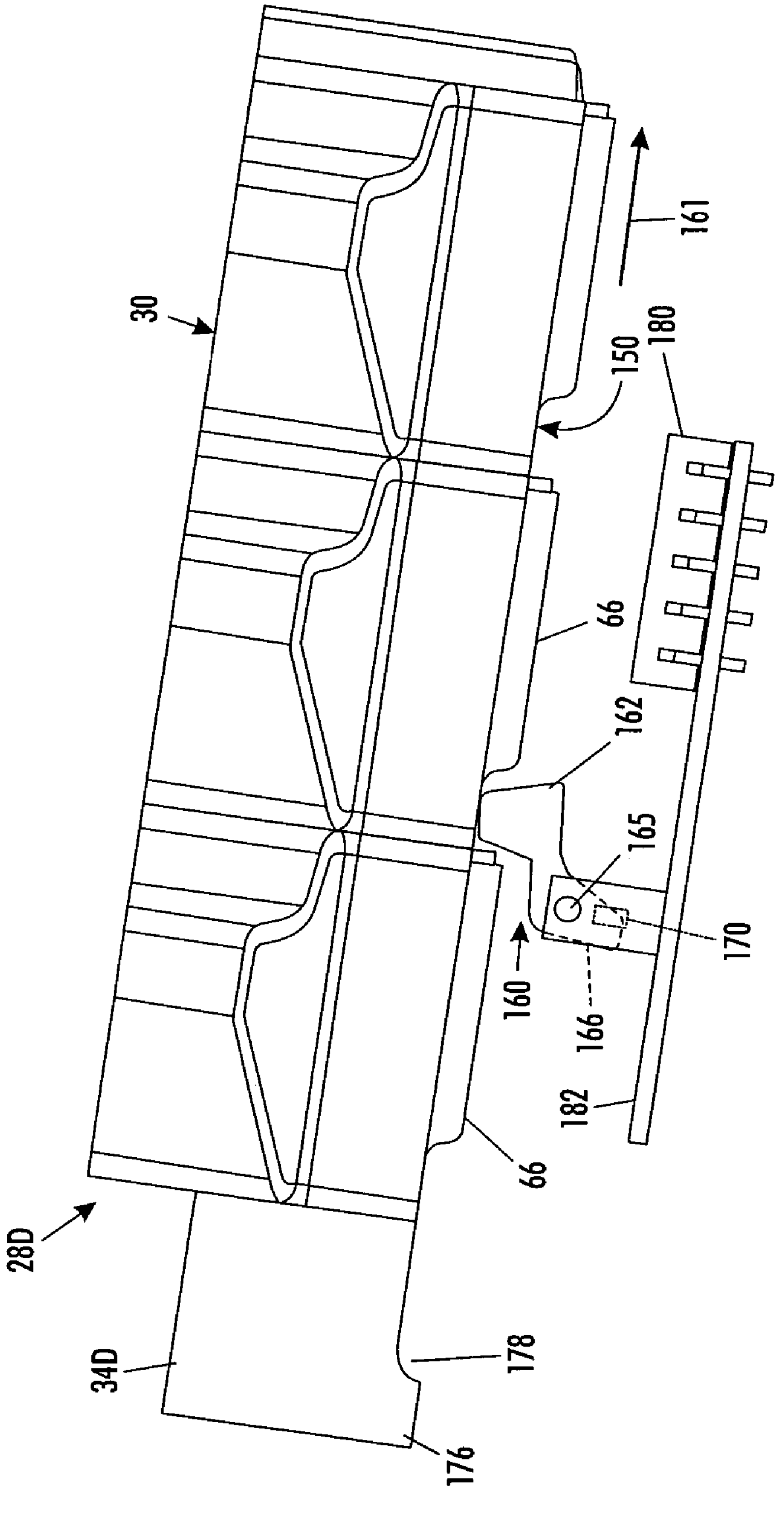
FIG. 15 is another view of the portion of the ink stick feed channel of FIG. 14.

An exemplary ink stick sensing element and ink feed channel counting system for mechanical counting of the ink sticks is shown in FIGS. 11-13. The fourth ink feed channel 28D is shown in the example. The proportions of certain elements of the counting system shown in FIGS. 11-13 are exaggerated to ease viewing of the components and their operations. Certain elements of the ink stick feed channel, including the feed channel guide rail 40D, are omitted from the illustrations. A duplicate counting system is positioned in each of the other ink feed channels 28A, 28B, 28C. The ink sticks travel along the feed channel in an ink stick feed direction 161. Each ink stick 30 includes a sensing element 150 positioned to engage an ink channel counting mechanism 160. In the embodiment illustrated in FIGS. 11-13, the ink channel counting mechanism includes a movable detector element that includes a finger 162 attached to a pivoting arm 164. One end of the arm 164 includes a flag 166 that engages a detector, such as an opto-sensor 170. In an example, the sensing element 150 of the ink stick is a feature formed in an external surface of the ink stick. In an example, the sensing element is formed of the ink stick material. In a particular example, the sensing element 150 is formed in the top surface of the ink stick. Ink sticks may have elements formed in external sides of the ink stick body when the ink stick body is molded into its shape. The finger 162 and the arm 164 are fixed to one another to move as a unit about a fixed pivot point 165. Referring to FIGS. 12 and 13, as the ink sticks progress in the feed direction 161 along the feed channel 28D, the distal end of the finger 162 of the feed channel counting mechanism 160 slidingly engages the surface of the ink sticks. When an ink stick sensing element 150 passes the distal end, or tip, of the finger 162, the finger enters the sensing element, and the finger 162 and arm 164 of the counting mechanism pivot about the pivot point 165, causing the opto-sensor 170 to detect that another ink stick is passing the counting mechanism. In the particular embodiment illustrated, when the distal end (tip) of the finger 162 engages the primary surface of the ink sticks, the flag 166 obstructs the light beam of the opto-sensor 170 (FIG. 12). When the sensing element 150 passes the ink channel counting mechanism, the tip of the finger 162 enters the recessed ink stick sensing element 150, causing the arm 164 to pivot in a clockwise direction, which in turn causes the flag 166 to be removed from the opto-sensor 170 (FIG. 13). With the flag 166 removed from the opto-sensor, the beam of light from a light source 172 is detected by a light detector 174. Upon the ink sticks continuing to move along the feed channel, the finger 162 leaves the sensing element and returns to a position abutting the surface of the ink stick, causing the arm 164 to pivot in a counterclockwise direction so that the flag 166 again enters the opto-sensor, interrupting the beam of light. The light emitted by the light source 172 does not reach the light detector 174. A counter 180 is connected through the circuit board 182 to the opto-sensor 170. The counter maintains a count of the number of times that the opto-sensor detects that the arm has moved to indicate that another ink stick has passed the counter. The counter 180 may also be a portion of the electronic printer controller 70 (FIG. 6).

In the alternative, sensing element 150 may be a protrusion from the face surface of the ink stick. In other alternatives, the sensing feature may be formed as a recess or a protrusion on an exterior surface of the ink stick other than the top surface. In examples, a roller (not shown) may be fitted at the end of the finger 162 to reduce the friction between the finger 162 and the surface of the ink stick. The tip of the finger 162 is large enough, and the gap between adjacent ink sticks kept small enough, that the arm 164 does not rotate sufficiently to trigger the opto-sensor 170 when the finger passes over the gap between adjacent ink sticks. However, in other embodiments the ink sticks may be formed so that a gap between adjacent ink sticks performs the function of the sensing element 150 by permitting the arm 164 to rotate sufficiently to trigger the opto-sensor detector. Those skilled in the art will also recognize that the opto-sensor 170 and the flag 166 can be configured so that the flag 166 is normally out of the opto-sensor, so that the light beam from the light source 172 normally completes the path to the light detector. Movement of the arm 164 in response to the passage of an ink stick sensing element causes the flag 166 to interrupt the light beam.

FIGS. 14-17 illustrate an embodiment in which an ink stick feed channel counter detects a sensing element formed on the bottom of the ink stick, and in particular formed in the guide element on the bottom surface of the ink stick. FIG. 18 shows an exemplary ink stick for use with the ink stick feed channel counter of FIGS. 14-17.

The ink stick shown in FIG. 18 is substantially the same as the ink stick shown in FIG. 9, with the addition of the sensing element 150 formed in the ink stick guide element 66. The ink channel counting mechanism 160 includes a moveable one piece counter arm with a finger 162, the distal end of which slidingly engages a portion of the ink sticks, such as the protruding guide element 66. As the finger 162 encounters the ink stick sensing element 150 formed in the ink stick, the counter arm 160 pivots about a fixed pivot point 165. A sensor, such as the opto-sensor 170, detects the movement of the counter arm and sends a signal to the counter 180. In an example, the counter arm is biased by a biasing mechanism, such as a spring (not shown), to urge the finger 162 against the ink stick body in the feed channel. When the finger 162 engages the guide element 66, the counter arm 160 pivots about the pivot point 165 into a first position so the flag 166 is removed out of the path of the light beam of the opto sensor 170. The ink stick sensing element 150 is formed as a recess in the ink stick guide element 66 (see FIG. 18) so when the finger 162 encounters the ink stick sensing element 150, the arm pivots into a second position in which the flag portion 166 enters the opto-sensor and interrupts the light beam of the opto sensor 170.

Although the ink stick sensing element 150 is shown at one end of the ink stick, the ink stick sensing element may be formed in any section of the guide element 66. In addition, the sensing element may be formed in a different portion of the bottom external surface of the ink stick, or in another external surface of the ink stick. In alternative configurations, the ink stick sensing element can be a protrusion from an external surface of the ink stick. In examples, the feed channel counter is positioned so that it detects the ink stick sensing feature of an ink stick as the leading end external surface of the ink stick first contacts the melt plate.

A direct optical sensor can be used to detect the ink stick sensing element 150. In an example, a light source directs an optical beam across the path of the ink stick guide element 66. The ink stick guide element generally blocks the light beam, so that a light detector on the opposite side of the path of the ink stick guide element does not detect the beam. When the ink stick sensing element 150 passes the light source, the absence of the ink stick sensing element 150 passes the light source, the absence of the ink stick guide element permits the light beam to reach the detector.

Figure 16:
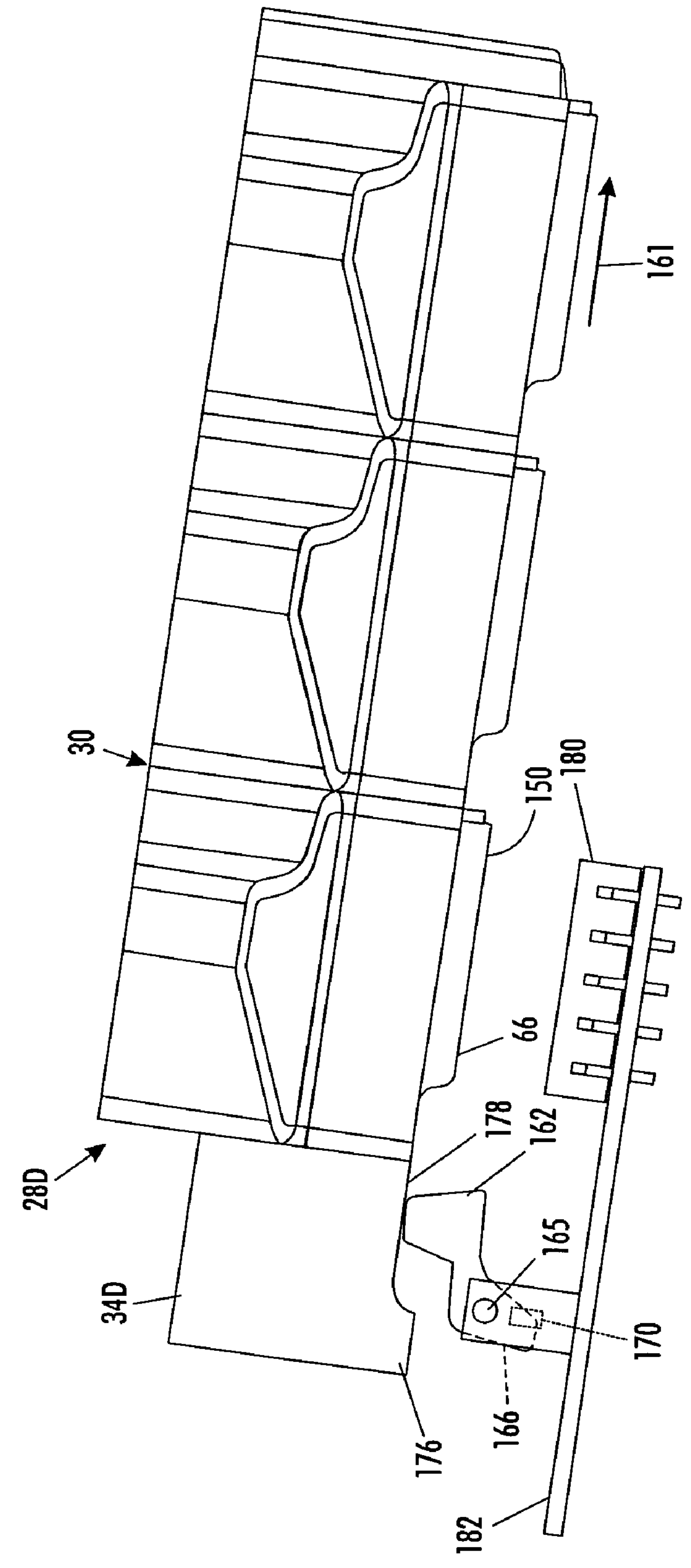
FIG. 16 is another view of the portion of the ink stick feed channel of FIG. 14.

Referring to FIG. 16, the ink stick feed channel counter is also able to detect when the supply of ink sticks in the feed channel is nearly exhausted. An ink stick follower, such as the push block 34D of the feed channel includes a guide follower or sweep element 176 that is contoured to at least partially engage the lower guide rail 40D in the ink stick feed channel. In a configuration, a recess or detect segment 178 at the leading portion of the push block does not engage the lower guide rail, allowing the finger 162 of the counting mechanism to remain in the second position for a longer duration of time than it does when an ink stick having the ink stick sensing element 150 is followed by another ink stick having the ink stick guide element 66. The counter 180 is programmed with information concerning expected durations of the time that the finger 162 is expected to remain in its second position as an in stick is being melted. Such expected times can be estimated using information about the length of time the melt plate is activated, and the expected ink melt rate while the melt plate is activated.

Figure 17:
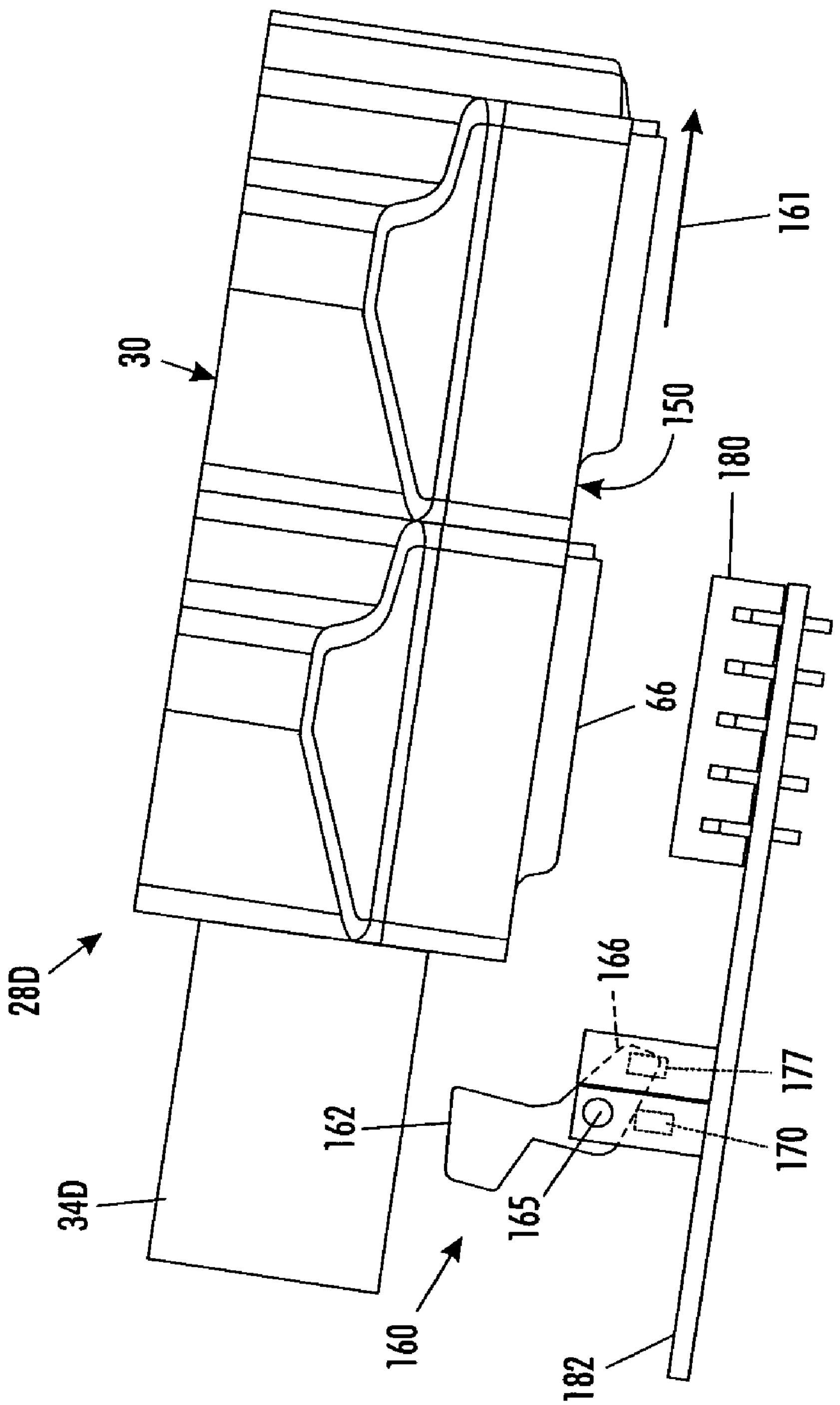
FIG. 17 is a stylized elevation view of a variation of the ink stick feed channel of FIG. 14.
Figure 18:
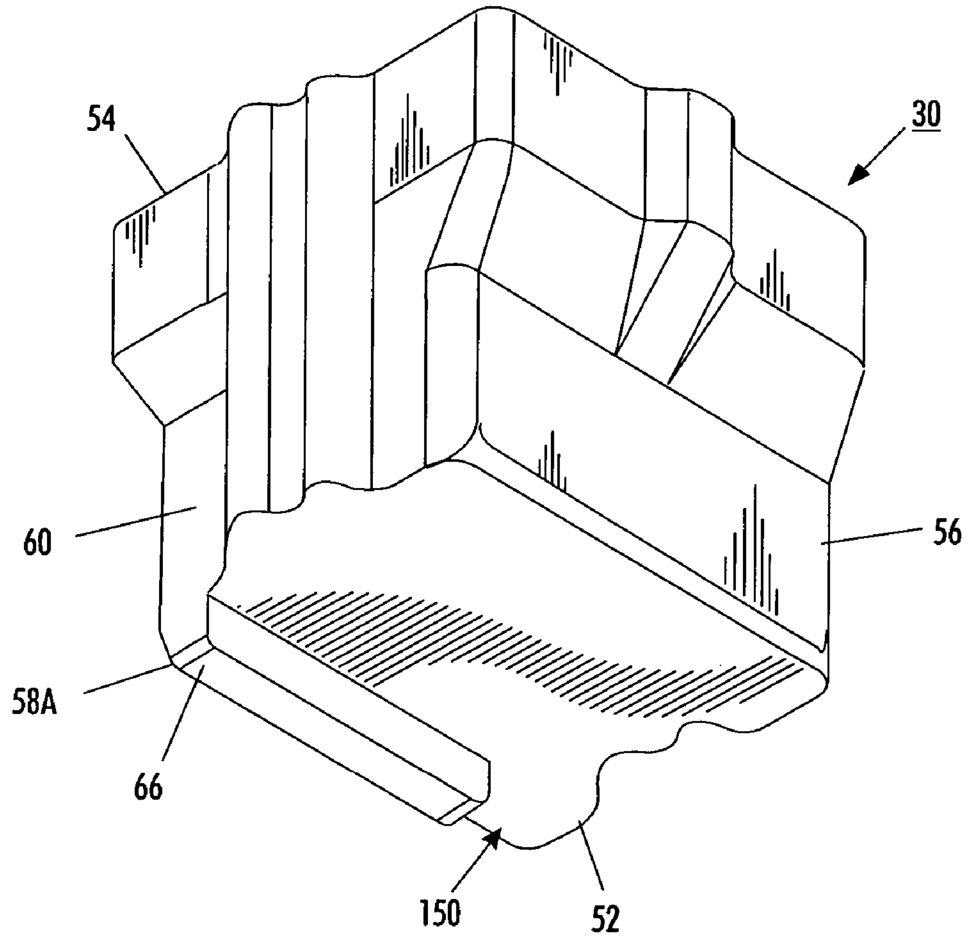
FIG. 18 is a perspective view of an exemplary ink stick for use in the ink stick feed systems of FIGS. 14-17.

FIG. 17 shows an exemplary ink stick counter with another implementation of a capability to indicate that the printer is near the end of its loaded supply of solid ink sticks. As the end of the last ink stick passes the distal tip of the finger 162, the counter arm 160 moves into a third position. In an example, the third position is rotated further counter-clockwise from the second position. A second sensor detects that the counter arm 160 is in its third position. In an example, a second opto-sensor 177 detects the flag 166 when the counter arm is in its third position by being positioned so that the flag interrupts the beam of light of the second opto-sensor. The counter can be positioned so that it detects the "low ink" condition when the leading edge or nose of an ink stick encounters melt plate of the ink feed channel, leaving a predetermined number of whole ink sticks in that particular ink feed channel. If the printer controller already has determined the current average ink drop size, the printer controller is able to calculate the number of ink drops that can be ejected before the supply of ink is fully exhausted.

Using an ink stick counter with the additional capability to indicate that the printer is near the end of its loaded supply of solid ink sticks allows the printer to identify which ink color has a low supply, without substantial additional components. Existing printers have identified when at least one of the ink feed channels had a low supply of ink, but did not identify which ink feed channel had the low supply.

An alternative ink stick counting mechanism that counts inks sticks as they are melted by the melt plate 32A, 32B, 32C, 32D includes a temperature measuring thermistor of the melt plate and a change in the cross-sectional area of the ink stick. The thermistor detects a change in temperature at the melt plate when the changed cross-sectional shape encounters the melt plate. For example, a void or gap in the ink stick causes a smaller area of ink stick material to encounter the melt plate, leading to an elevated temperature at the melt plate.

Figure 19:
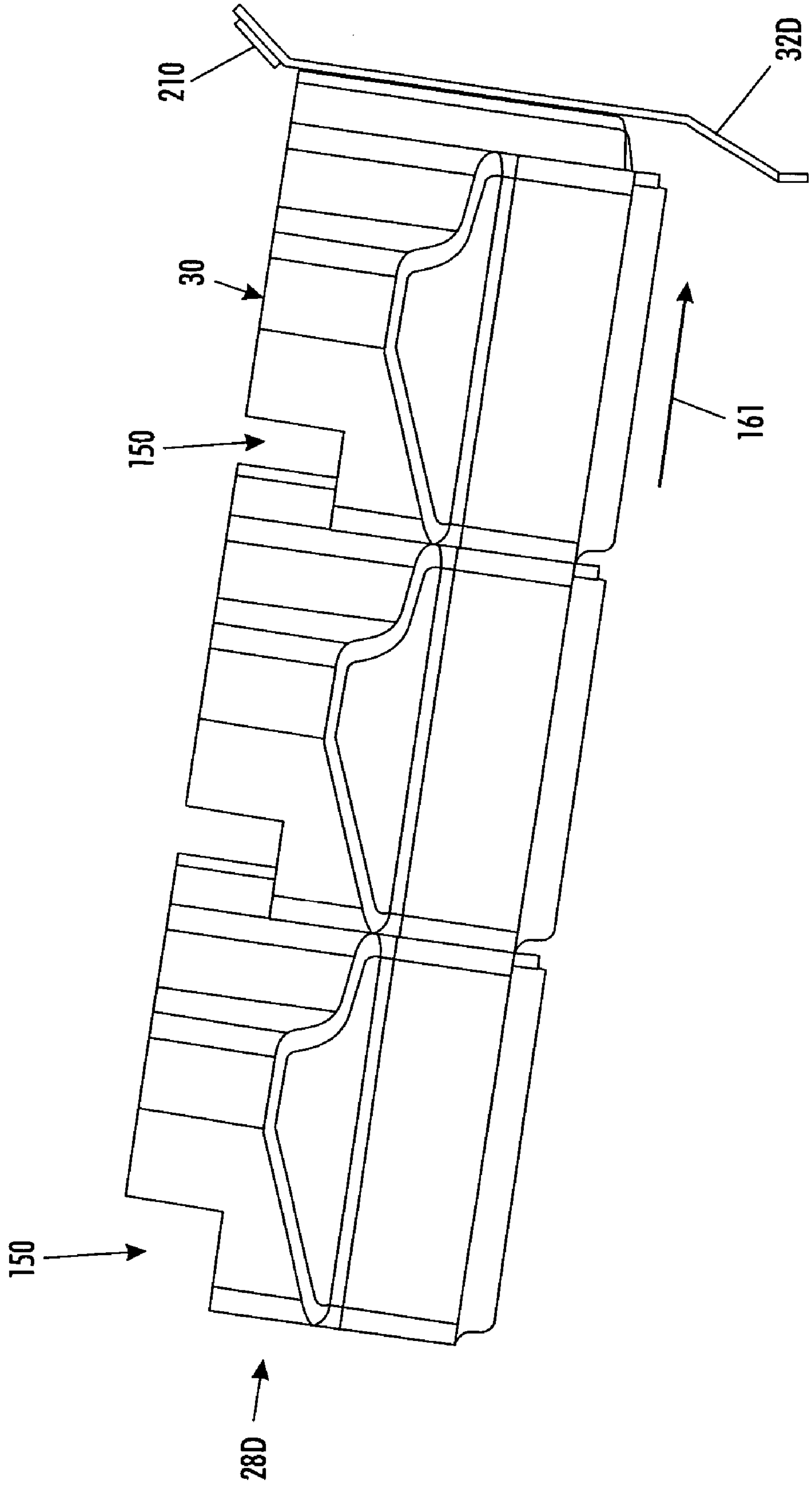
FIG. 19 is a stylized elevation view of a portion of an ink stick feed channel with another ink stick counting feature.
Figure 20:
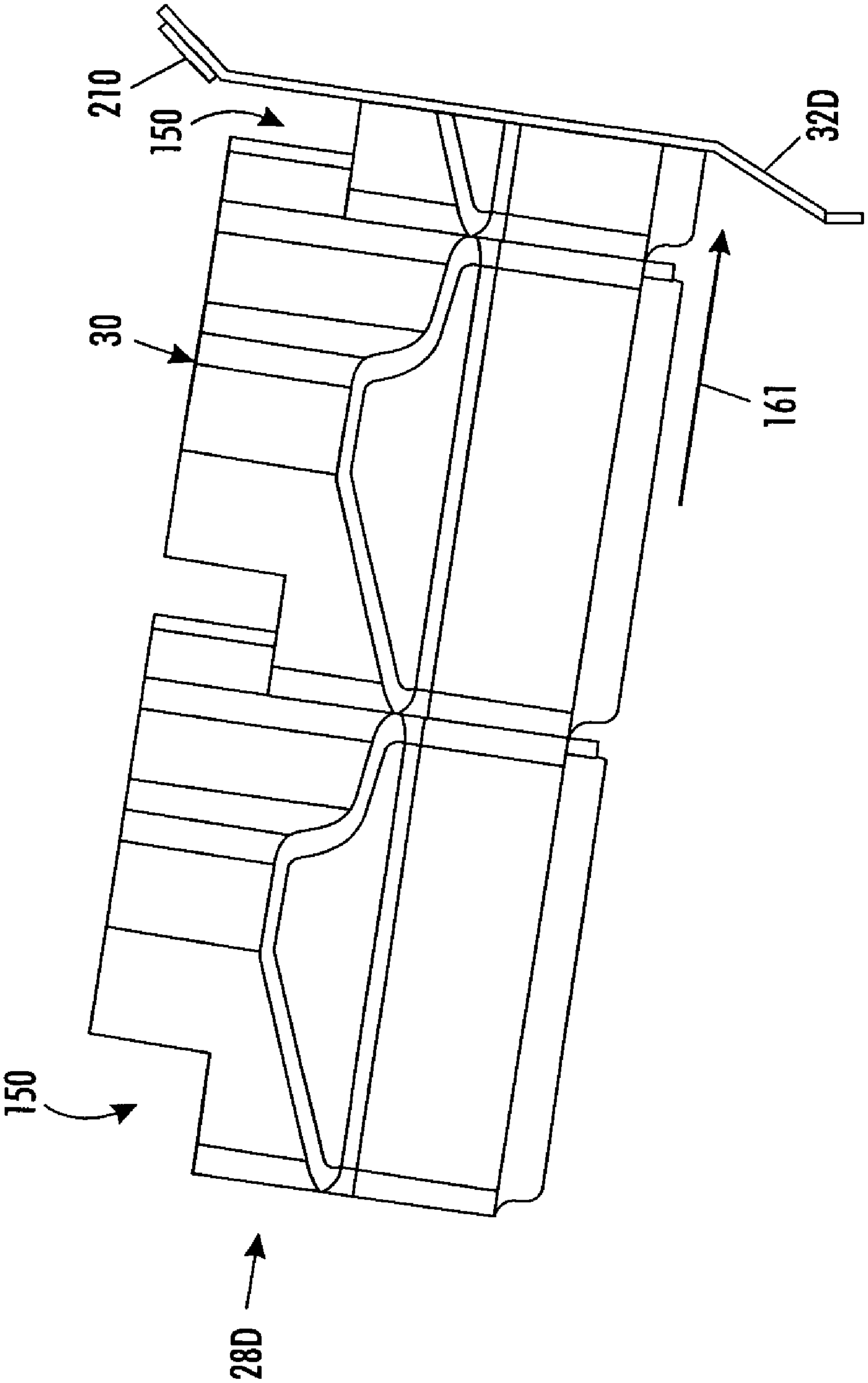
FIG. 20 is another view of the ink stick feed channel of FIG. 19.

FIGS. 19 and 20 illustrate an example in which a temperature change at the melt plate is detected as the ink stick sensing element 150 encounters the melt plate, to count the ink sticks that are melted by the melt plate. In an example, a temperature sensor, such as a thermistor 210, is attached to a portion of each melt plate, such as the melt plate 32D of the fourth ink feed channel 28D. The thermistor detects the temperature at the melt plate, and is connected to transmit that temperature information to an electronic control module, such as the printer controller 70 (FIG. 6). In a configuration, the printer applies energy to the melt plate at a substantially constant rate to heat the melt plate. This energy is converted into melting the ink stick on a continuing basis. The nominal cross-sectional area of a portion of each ink stick, perpendicular to the ink stick feed direction, is substantially constant, so that the temperature of the melt plate remains relatively constant during the melting process. The ink stick contains a sensing element 150 that changes the cross-sectional area of the ink stick transverse to the ink stick travel direction, that encounters the melt plate for melting during a time as the ink stick is consumed, as shown in FIG. 19. When the amount of ink being melted changes, the constant energy input to the melt plate causes the temperature of the melt plate to change. In an example, the sensing element 150 is a recess or void in the body of the ink stick, so that a reduced amount of ink is being melted by the melt plate. With less ink against the melt plate, the temperature of the melt plate rises. The thermistor 210 detects this changed melt plate temperature, and communicates that information to the electronic control module. The electronic control module analyzes the temperature information from the thermistor to determine if the changed temperature indicates the presence of an ink stick sensing element 150. The ink stick sensing element is large enough that the electronic control module does not incorrectly count as an ink stick sensing element small gaps that may occur in certain places in the ink sticks. The portion of the ink stick with the ink stick sensing element has a cross-sectional area that differs substantially from the cross-sectional area of the portion of the ink stick away from the ink stick sensing element. In examples, the cross-sectional area of the ink stick in a plane perpendicular to the travel direction 161 at the sensing element, differs from the cross-sectional area of the other portions by at least 20%, so that with the ink stick sensing element or recess, the cross-sectional area of the ink stick portion at the ink stick sensing element is less than 80% of the cross-sectional area of another portion of the ink stick, and may be less than 75% or even less than 66% (⅔) of the cross-sectional area of the other portion of the ink stick, down to approximately 50% of the other cross-sectional area. The ink stick sensing element also has a dimension in the ink stick feed direction. This feed direction dimension is at least approximately 10% of the feed direction, and may encompass up to 20%-25% of the feed direction dimension of the ink stick. The ink sticks of varying cross sectional shapes may be formed by press-molding, or compression molding, techniques.

In an example, the electronic control module records the peak temperature of a melt cycle and compares that peak temperature with the average and standard deviation of a number of preceding temperature readings. For example, the recorded peak temperature may be compared with the average of the preceding ten temperature readings. If the comparison reveals that the current recorded peak temperature exceeds by a significant margin the average of the preceding temperature readings, the electronic control module records that it has detected an ink stick sensing element 150, and counts an additional ink stick melted. For example, the electronic control module may record an ink stick count if the current recorded temperature reading exceeds the average of the preceding temperature readings by at least a predetermined threshold amount. In an example, the threshold may be at least three standard deviations of the preceding temperature readings.

In some instances, an ink jam in the ink feed channel may prevent ink sticks in the feed channel from reaching the melt plate. The absence of an ink stick at the melt plate could lead to a false count of an ink stick, if that absence were interpreted as the presence of an ink stick sensing element. Thus, in an embodiment, the electronic control module measures the time during which the thermistor detects the absence of ink stick material. If the time is greater than a predetermined time associated with the expected length of the sensing feature, the electronic control module does not record a count of an ink stick. In such a circumstance, the electronic control module could cause a warning to be displayed (visually or audibly) to the user, alerting the user to the possibility of an ink jam, or that the supply of ink sticks in the ink feed channel may be exhausted. In examples, the electronic control module notes or records the temperature at intervals of time. In such examples, the electronic control module measures the temperature at a second time after the time at which the temperature measurement indicates the presence of the ink sensing element. If the time interval between the first and second temperature measurements exceeds the time that the ink sensing element is expected to be present, and the temperature measurement indicates that the ink sensing element is still present, the electronic control module does not increment the ink stick counter, and may cause the warning to be displayed. The temperature measurement could indicate the continued presence of an ink stick sensing element by the second temperature measurement being closer to the first temperature measurement than to the average of the preceding temperature measurements, or being outside a determined range of variability around the average of the preceding temperature measurements.

The feed channel mechanism includes a biasing mechanism to help ensure that ink sticks do not alter their position on the melt plate as the ink sticks melt. Such movement of the ink sticks could alter the temperature sensed by the thermistor 210, and thus interfere with the detection of the ink stick sensing element. In an example, the melt plate is angled to help ensure that ink sticks as they melt do not move upward along the face of the melt plate. The melt plate may be angled so that the lower end of the melt plate is farther "downstream" in the ink stick feed channel than is the upper end of the melt plate. In an example, the melt plate may form an angle of 80-85 degrees, and in particular 85 degrees, with respect to the guide rail of the ink feed channel.

Figure 21:
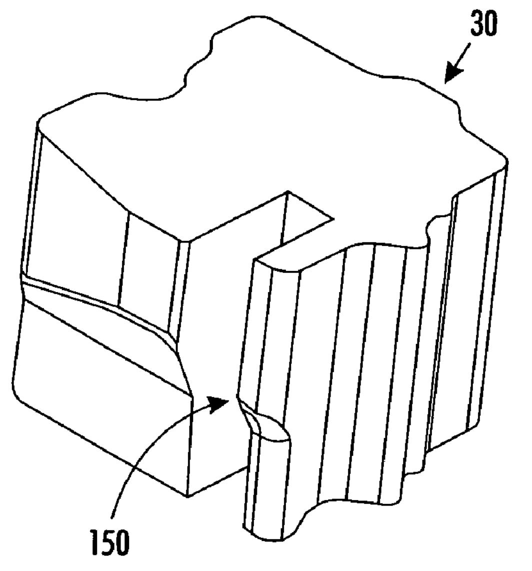
FIG. 21 is a perspective view of an exemplary ink stick for use in the ink stick feed systems of FIGS. 19 and 20.
Figure 22:
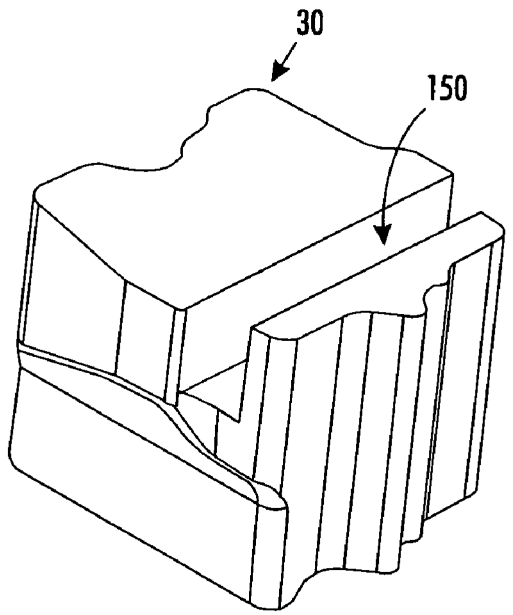
FIG. 22 is a perspective view of another exemplary ink stick for use in the ink stick feed systems of FIGS. 19 and 20.

Additional exemplary ink sticks having ink stick sensing element voids are shown in FIGS. 21 and 22. The length in the ink stick feed direction of the ink stick sensing element sets the length of the temperature change signal to be detected. The sensing element extends across an entire dimension of the ink stick. In the exemplary ink stick shown in FIG. 22, the ink stick sensing element void 150 extends across the upper portion of the ink stick body and is oriented substantially perpendicular to the direction of ink stick travel in the ink feed channel. The ink stick sensing element void extends to at least one side edge of the ink stick, and as illustrated to both side edges of the ink stick, so that melted ink does not fill the sensing element void 150 prior to the thermistor being able to detect the presence of the void. Based upon the present description, persons skilled in the art will recognize that the ink stick can include an area of enlarged cross-section as the ink stick sensing element. Such an enlarged cross-sectional area leads to a reduced melt plate temperature, as more of the energy is consumed in melting the greater quantity of ink.

Figure 23:
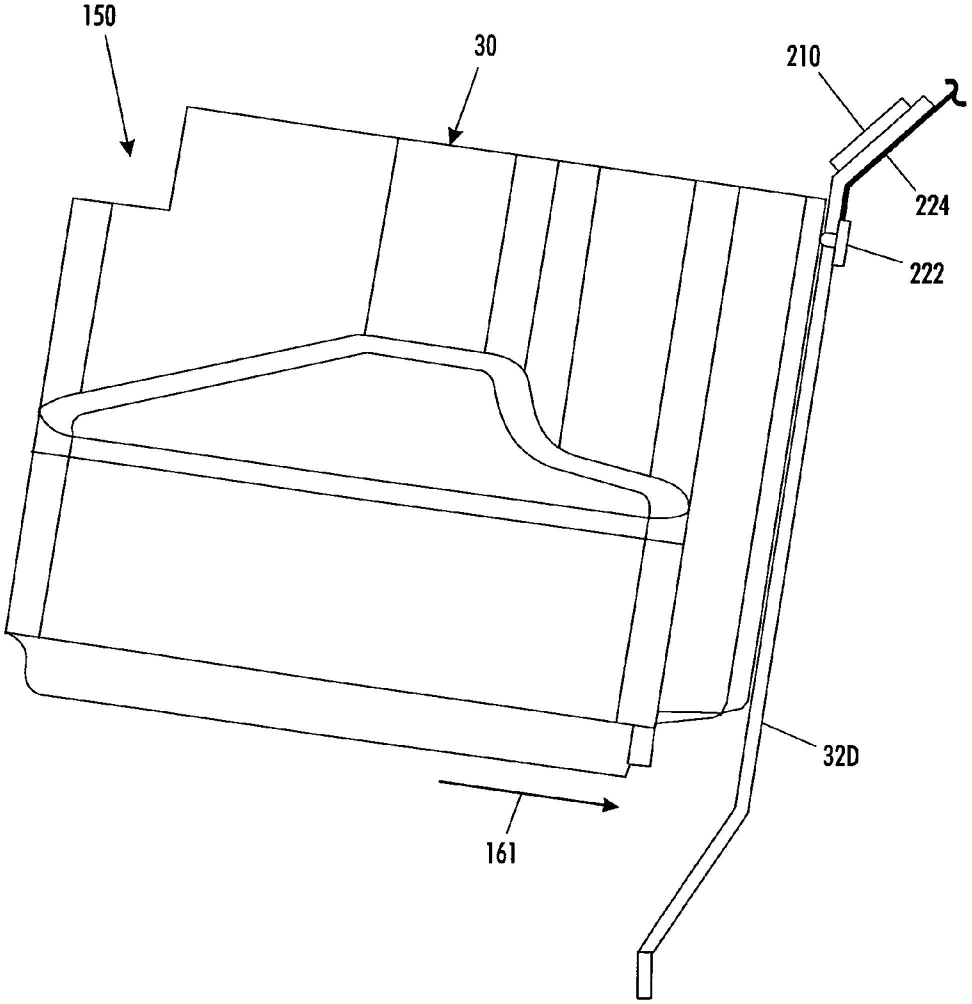
FIG. 23 is a stylized elevation view of a portion of an ink stick feed channel incorporating another ink stick counting system.

In another example shown in FIG. 23, the temperature in the ink stick melt zone is measured directly by a direct temperature sensor 222 embedded in the melt zone of the melt plate. In an example, the direct temperature sensor 222 is a second thermistor positioned on a face of the melt plate directed away from the face that encounters the ink sticks. The second thermistor protrudes through the melt plate so that the second thermistor encounters the ink stick and the ink stick sensing element as the ink stick is pressed against the melt plate 32D and melted.

The electronic control module initially heats the second thermistor to a relatively high temperature, such as 150° C. In the example illustrated, the second thermistor is positioned to detect the temperature in the ink stick melt zone of the melt plate. As the ink stick material is melted, the second thermistor detects the melt temperature of the ink, which may be approximately 110° C. In the ink stick shown, the ink stick sensing element 150 is a recess or void. When the void forming the sensing element encounters the second thermistor direct temperature sensor 222, the temperature of the second thermistor again rises to the relatively high temperature of 150° C. The temperature information detected by the second thermistor is communicated to an electronic control module, such as the printer controller 70, along a signal conduit 224. A first thermistor 210 is also be present to detect other temperature information associated with the melt plate 32D. The electronic control module performs one or more analysis algorithms to conclude that the identified temperature change actually indicates the presence of an ink stick sensing element to justify incrementing the ink stick count. Those analysis algorithms may include comparing a recorded temperature with temperatures previously recorded, to determine if the currently recorded temperature is materially different from an average of the temperatures previously recorded.

In certain implementations, the ink stick sensing element can be formed of a change in the cross-section of the ink stick, without changing the overall cross-sectional area of the ink stick. For example, an ink stick for use with the thermistor arrangement shown in FIG. 23 can be formed with a void positioned to encounter the direct temperature sensor 222. But, the ink stick may have other protrusions that maintain the overall cross-sectional area of the ink stick.

In yet other implementations, the direct temperature sensor 222 can be positioned in a region of the melt plate that is not met by the ink stick body. The ink stick sensing element can then be formed as a protrusion from the ink stick body, positioned and configured to contact the direct temperature sensor.

The printer can determine ink consumption more frequently by including additional ink stick sensing elements in each ink stick, and appropriately configuring the ink stick counter. The ink sticks used in the ink stick feed channel may include multiple ink stick sensing elements on each ink stick. The multiple ink stick sensing elements are arranged so that as the ink sticks move in the feed direction along the feed channel, during the time between repeated events of the counter, a substantially identical mass of ink stick material has passed the point in the feed channel at which the counter is located.

Figure 24:
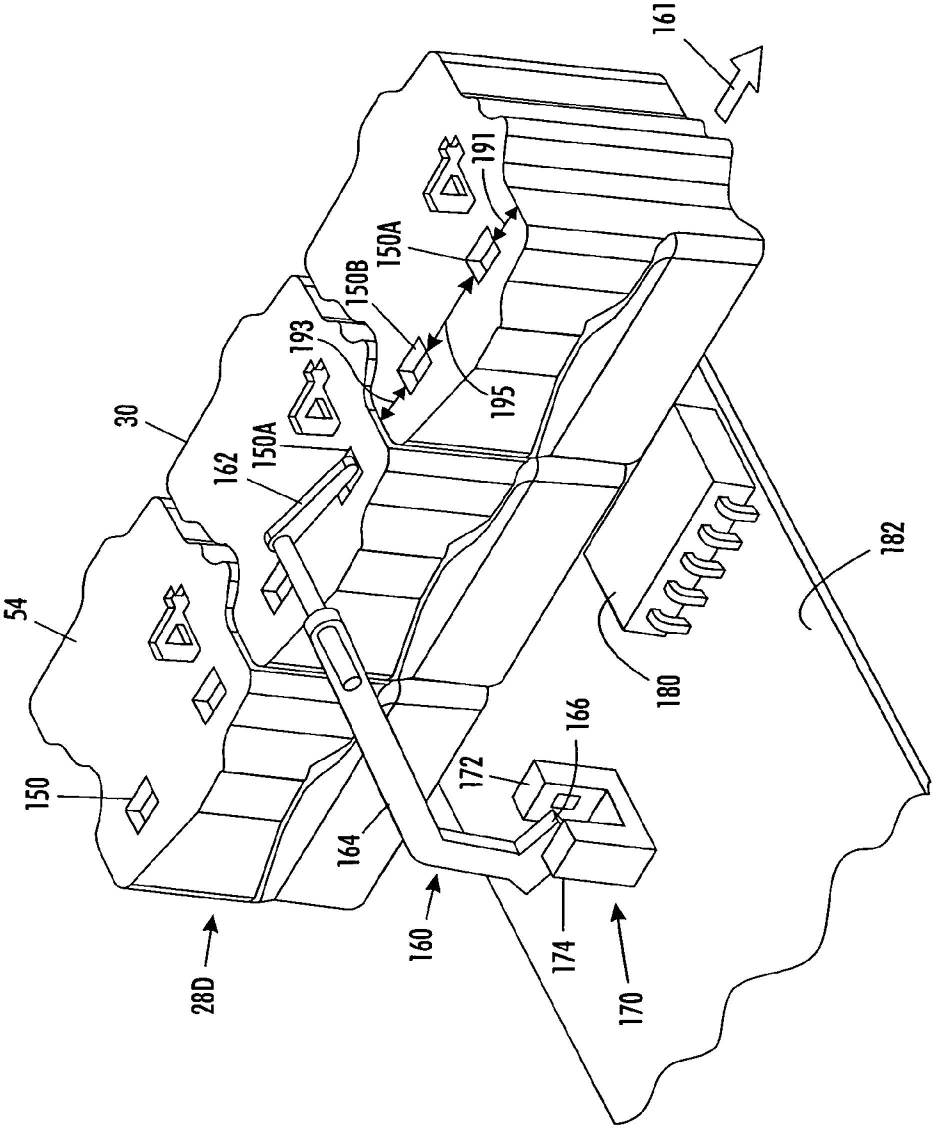
FIG. 24 is a perspective view of the ink stick feed channel of FIGS. 11-13 with ink sticks that provide additional ink stick counting capabilities.

Referring to the example shown in FIG. 24, the mechanical counting mechanism is the same as that shown in FIGS. 11-13. Each ink stick includes multiple ink stick sensing elements 150 in the outer surface of the ink stick. In a particular example, each ink stick includes two ink stick sensing elements, though other numbers of ink stick sensing elements may be included. In a further particular example, the ink stick sensing elements 150 are evenly spaced along the feed direction of the ink stick body so that an equal ink stick mass passes the ink stick counter between each sensing element. In a further example, the ink stick sensing elements are positioned on the ink sticks such that the ink stick mass between the sensing element 150B closest to the trailing end of one ink stick body and the sensing element 150A closest to the leading end of the following ink stick is identical to the ink stick mass between adjacent sensing elements on a single ink stick. Such spacing allows the ink stick counter to be configured to associate each detected ink stick sensing element with a fraction of an ink stick corresponding to the number of sensing elements 150 on each ink stick, thus allowing the ink stick counter to count partial ink sticks. To accomplish this, a first or leading ink stick sensing element 150A is relatively nearer to a leading end of the ink stick body, relative to the feed direction of travel 161. A last or trailing ink stick sensing element 150B is nearer to a trailing end of the ink stick body, with the trailing end of the ink stick body opposing the leading end. The leading distance 191 from the leading end of the ink stick body to the leading ink stick sensing element 150A plus the trailing distance 193 from the trailing ink stick sensing element 150B to the trailing end of the ink stick body is the same as the inter-element distance 195 along the feed direction between adjacent ink stick sensing elements. An example shown in FIG. 24 includes two ink stick sensing elements 150 on each ink stick. Additional ink stick sensing elements 150 may be included along the feed direction, each separated from an adjacent ink stick sensing element by the inter-element distance 195. Each ink stick sensing element also has the same dimension along the feed direction 161.

The partial ink stick counter identifies when a predetermined mass of ink has passed the counter. In some applications, the mass of the ink stick may not be constant along the length of the ink stick. In such an application, the ink stick sensing elements are spaced along the length of the ink stick so that the mass of the ink stick between consecutive movements of the counter arm that are of the same type. For example, if the ink stick has a variable cross-sectional area (and thus a variable mass per unit length), or a varying density to the ink stick material, the mass of the ink stick between the leading edges of consecutive ink stick sensing elements may be the same while the longitudinal distance between those edges may differ.

Partial or fractional ink stick counting allows the printer to perform the calibration process shown in FIG. 8 without having to wait for whole ink sticks to be consumed. In addition, such fractional ink stick counting improves the ability of the printer to obtain an ink stick count between unusual events, such as nozzle purging or other printhead maintenance functions.

Figure 25:
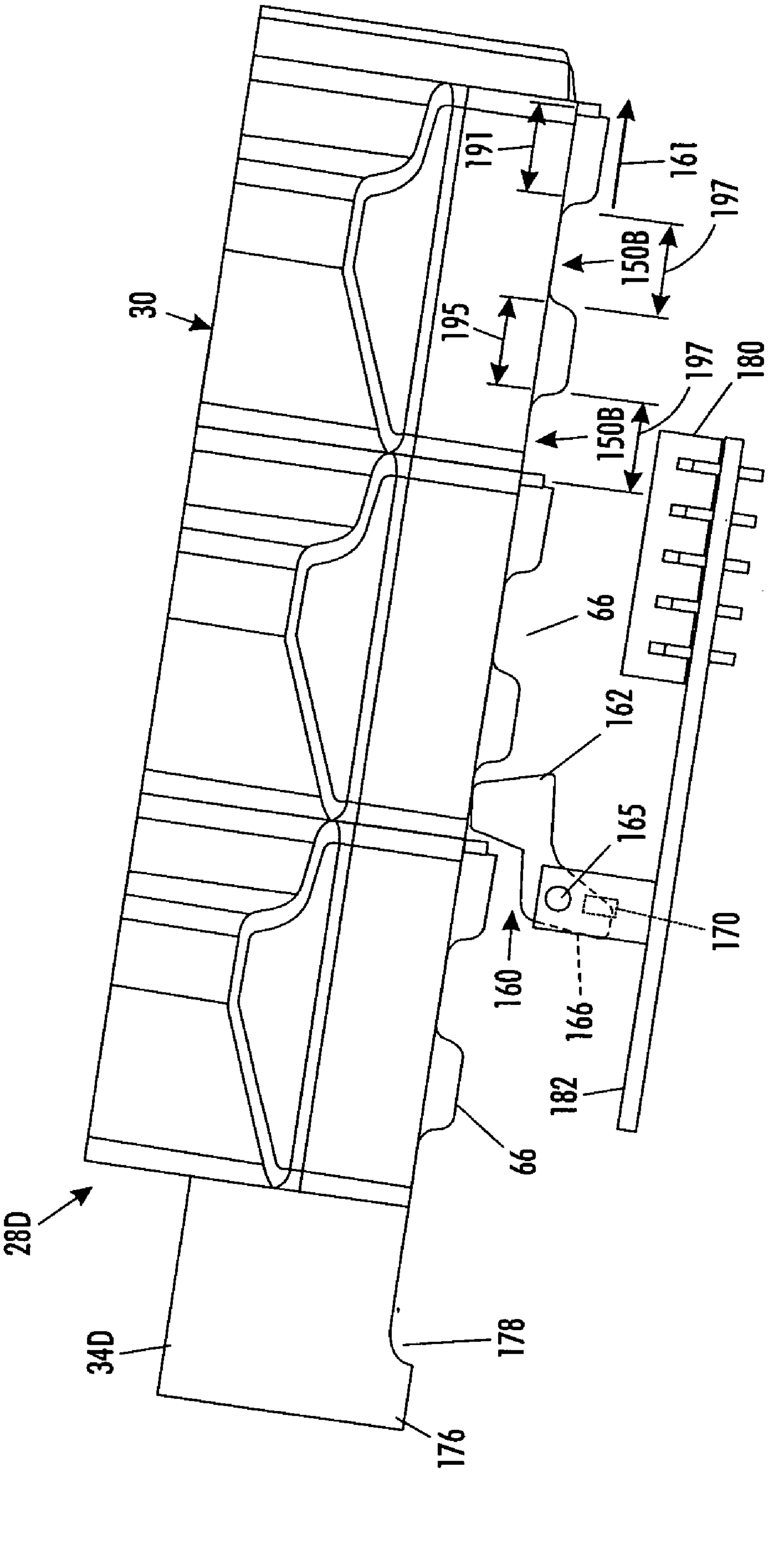
FIG. 25 is a stylized elevation view of the ink stick feed channel of FIGS. 14-17 using ink sticks that provide additional ink stick counting capabilities.
Figure 26:
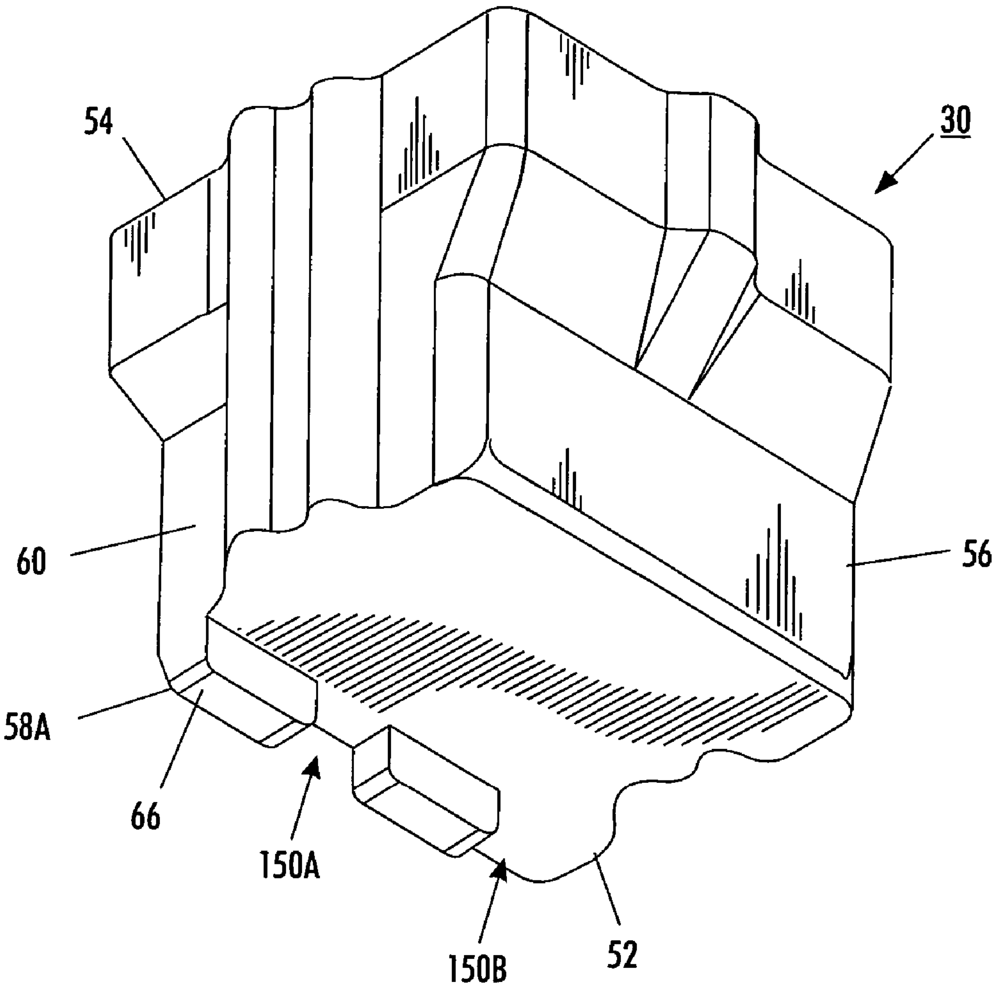
FIG. 26 is a perspective view of an exemplary ink stick for use in the ink stick feed system as shown in FIG. 25.

FIG. 25 shows the ink stick counting mechanism shown in FIGS. 14-17 configured to count fractional ink sticks. The ink stick counting mechanism uses ink sticks having multiple ink stick sensing elements 150. In an example, the sensing elements 150 are equally spaced along the ink stick guide element 66. In a further example, the spacing between the sensing elements are spaced in the feed direction 161 so that the spacing between the sensing elements on adjacent ink sticks in the feed channel is identical to the spacing between sensing elements on a single ink stick. Such spacing allows the counter to be configured to associate each detected ink stick sensing element with a fraction of an ink stick corresponding to the number of sensing elements on each ink stick. In the particular example shown in FIG. 25, one of the sensing elements is formed at one end of the ink stick body, specifically the trailing end. In this example, there is no trailing distance from the trailing ink stick sensing element 150B to the trailing end of the ink stick. The leading distance 191 from the leading end of the ink stick to the leading ink stick sensing element 150A is the same as the inter-element distance 195 between adjacent ink stick sensing elements. Each ink stick sensing element has the same distance 197 in the feed dimension so that as the ink sticks move in the feed direction the ink stick mass between the leading edges of the sensing elements 150 is identical. FIG. 26 shows an ink stick for use in the system shown in FIG. 25.

Following the present description, persons skilled in the art will recognize that the leading ink stick sensing element may be formed at the leading end of the ink stick, with a trailing distance between the trailing ink stick sensing element and the trailing end of the ink stick. Persons skilled in the art will also recognize that the leading and second ink stick sensing elements can be formed at the leading and trailing ends of the ink stick, so that the counter identifies the combination of the trailing sensing element of one ink stick and the leading or first sensing element of the following ink stick as a single sensing element. In an implementation, each of the leading and trailing ink stick sensing elements has a dimension in the feed direction of one half the dimension of ink stick sensing elements that are intermediate along the ink stick.

Figure 27:
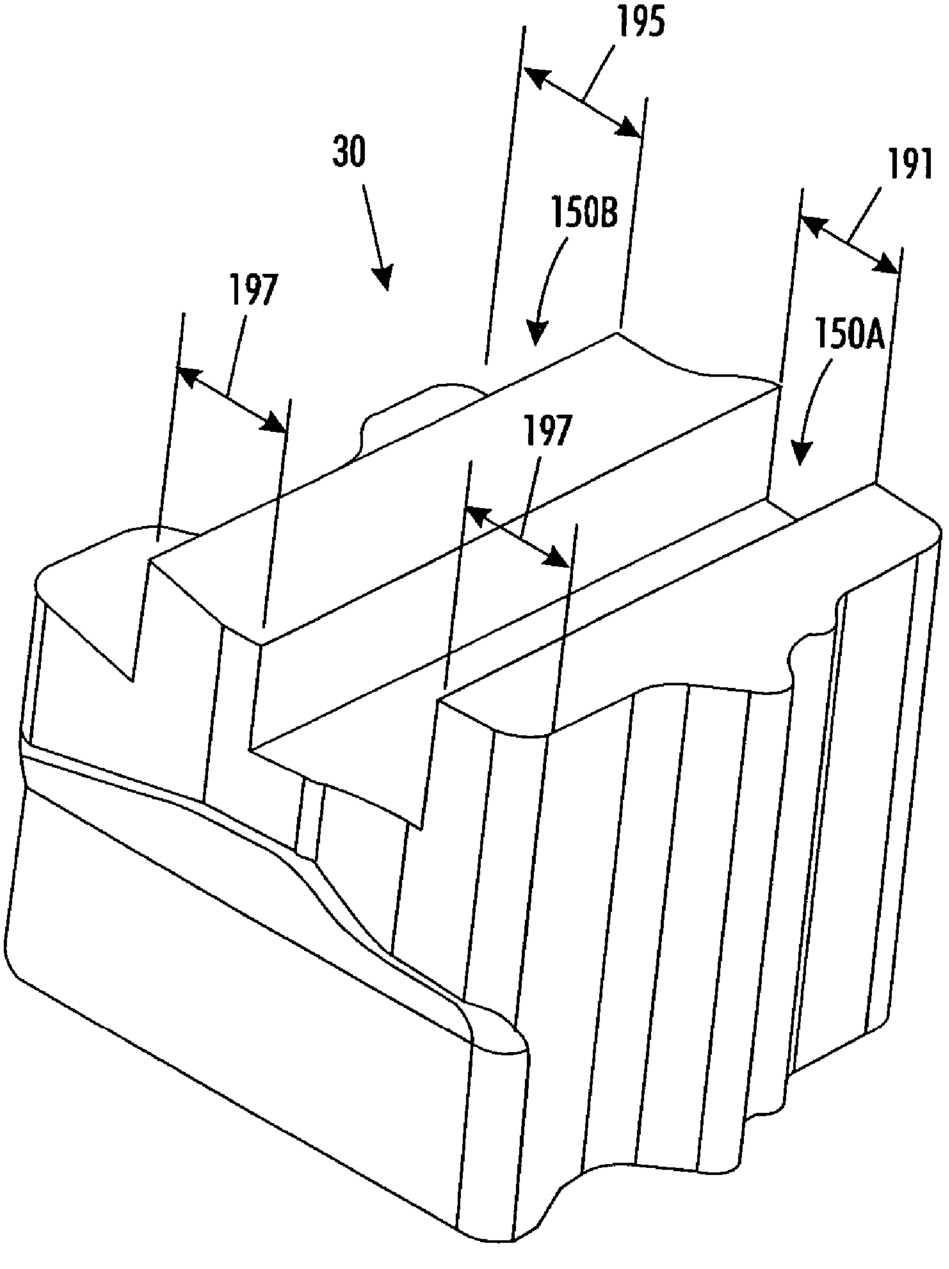
FIG. 27 is a perspective view of an exemplary ink stick for providing additional ink stick counting capabilities in the ink stick feed channels of FIGS. 19, 20, and 23.

FIG. 27 shows an ink stick having multiple sensing elements appropriate for use in a feed system in which temperature changes at the melt plate are detected as the ink stick sensing element encounters the melt plate, such as the systems shown in FIGS. 19-20 and 23. In examples, the ink stick mass between corresponding edges of each of the ink stick sensing elements is the same.

The ink stick counters in the printer may be configurable by a user, a system administrator, or service technician, with respect to the number of ink stick sensing elements that appear on each ink stick. Such configurability allows the printer to be adjusted to accommodate different ink sticks. Such configurability can be supplied through a combination of instructions on the front panel display screen 16 and the buttons 18, or through a printer driver installed on an associated computer.

With the teaching of the present disclosure, persons skilled in the art are able to create various modifications to the specific implementations and examples shown and described without departing from the principles of the present invention. Therefore, the present invention is not limited to the preceding specific implementations and examples shown and described. Variations include different ink stick feed channel structures, different ink stick shapes, and different melt device configurations. In addition, various specific shapes for the ink stick sensing element can be used, including both recessed and protruding ink stick sensing element shapes, and electronic and mechanical sensors in the ink stick feed system.

We claim:

1. A method of loading an ink stick into a solid ink feed system of a phase change ink jet printer, the method comprising:

providing an ink stick having on an external surface thereof an elongate guide element;

inserting an ink stick in an insertion direction into an ink stick feed channel of the solid ink feed system;

wherein inserting the ink stick comprises inserting the ink stick with guide element entering the ink stick feed channel before other portions of the ink stick;

positioning the ink stick in the ink stick feed channel so that the elongate guide element forms a load bearing contact with an ink channel guide rail in the ink stick feed channel;

urging the ink stick to travel in a feed direction along the ink stick feed channel;

wherein urging the ink stick to travel along the ink stick feed channel comprises allowing the ink channel guide rail to guide the ink stick as the ink stick travels in the feed direction causing the guide element to urge a counting clement into a first position;

causing an ink stick sensing element portion of the guide element to urge the counting element into a second position; and detecting when the counting element changes between its first position and its second position.

2. In an ink printer in which ink is received as discrete substantially solid ink sticks, an apparatus comprising:

an ink feed system for conducting ink sticks along an ink stick feed channel;

one or more ink sticks in the ink stick feed channel, each of which is configured with an ink stick sensing element formed in an external surface of the ink stick;

a movable counting mechanism;

wherein at least a portion of the movable counting mechanism is positioned to engage a predetermined portion of each ink stick that is being conducted along the ink stick feed channel; and wherein the movable counting mechanism is adapted to change positions when the movable counting mechanism engages the ink stick sensing element at the predetermined portion of each ink stick.

3. The apparatus of claim 2, wherein the movable counting mechanism comprises:

an arm having a proximal end and a distal end; and a sensor for detecting movement of the arm.

4. The apparatus of claim 3, wherein the distal end of the arm extends into the ink stick feed channel.

5. The apparatus of claim 3 additionally comprising a counter for accumulating a count of arm movement detections detected by the sensor.

6. The apparatus of claim 5, wherein each ink stick sensing element formed in an external surface of an ink stick is positioned to cause the arm to move as the ink stick is conducted along the ink stick feed channel.

7. The apparatus of claim 2, wherein the ink stick sensing element comprises a recess formed in the external surface of the ink stick.

8. The apparatus of claim 2, wherein the ink stick sensing element comprises a protrusion formed on the external surface of the ink stick.

9. An ink stick comprising:

a three dimensional ink stick body that is formed of ink stick material and adapted to travel along an ink stick feed channel; and an ink stick sensing element formed as one of an indentation and a protrusion on an external surface of the ink stick body, wherein the ink stick sensing element is configured to move a movable counting mechanism in the ink stick feed channel as the ink stick travels along the ink stick feed channel.

10. The ink stick of claim 9, wherein:

the ink stick body is adapted to be inserted in an insertion direction into the ink stick feed channel;

the ink stick body is adapted to travel in a feed direction along the ink stick feed channel, different from the insertion direction; and the ink stick sensing element is formed on an external surface of the ink stick body that is substantially perpendicular to the insertion direction.

11. The ink stick of claim 9, wherein:

the ink stick body is adapted to be inserted in an insertion direction into the ink stick feed channel;

the ink stick body is adapted to travel in a feed direction along the ink stick feed channel, different from the insertion direction; and the external surface of the ink stick body having the ink stick sensing element is substantially perpendicular to the insertion direction.

12. The ink stick of claim 9, wherein:

the ink stick body has a longitudinal guide element formed in the external surface of the ink stick body.

13. The ink stick of claim 12, wherein the ink stick body is adapted so that when the ink stick is inserted into the solid ink feed channel, the longitudinal guide element forms a load-bearing contact with the solid ink feed channel.

14. The ink stick of claim 13, wherein:

the longitudinal guide element is a protrusion from the ink stick body; and the sensing element is an indentation in the guide element.

15. The ink stick of claim 13, wherein:

the longitudinal guide element is a protrusion from the ink stick body; and the sensing element is a protrusion in the guide element.

16. The ink stick of claim 9, wherein:

the ink stick body is adapted to travel in a feed direction along the ink stick feed channel;

the ink stick body is adapted to be inserted into the ink stick feed channel in an insertion direction, substantially perpendicular to the feed direction;

the ink stick body includes a guide element adapted to interact with a guide rail in the ink stick feed channel in guiding the ink stick body in the feed direction; and the ink stick sensing element comprises a portion of the ink stick guide element.

17. The ink stick of claim 16, wherein:

the ink stick guide element comprises an elongate protrusion along an external surface of the ink stick body; and the ink stick sensing element comprises an indentation in the elongate protrusion of the ink stick guide element.

18. An ink stick for use in a solid ink feed system of a phase change ink jet printer, the ink stick comprising:

an ink stick body;

a longitudinal ink stick guide element formed in a portion of the ink stick body;

wherein the ink stick body is adapted so that when the ink stick is inserted into the solid ink feed system, the longitudinal ink stick guide element forms a load-bearing contact with the solid ink feed system; and wherein a portion of the longitudinal ink stick guide element comprises an ink stick sensing element adapted to operatively engage a counting element in the solid ink feed system.

19. The ink stick of claim 18, wherein: the ink stick is adapted to travel in a feed direction through the ink feed system:

the longitudinal ink stick guide element is oriented in the feed direction; and the ink stick sensing element is located at an end of the longitudinal ink stick guide element relative to the feed direction.

20. The ink stick of claim 18, wherein:

the ink stick is adapted to be inserted into the solid ink feed channel in an insertion direction;

the ink stick is adapted so that as the ink stick is inserted into the solid ink feed system in the insertion direction, the longitudinal ink stick guide element enters the solid ink feed channel before a majority of the ink stick body enters the solid ink feed channel.

21. The ink stick of claim 20, wherein:

the ink stick guide element comprises an elongate protrusion along an external surface of the ink stick body; and the ink stick sensing element comprises a recess in the elongate protrusion of the ink stick guide element.

22. An ink stick for use in a solid ink feed system of a phase change ink jet printer, wherein the solid ink feed system comprises an ink stick feed channel having an elongate feed channel guide rail, the ink stick comprising:

a three dimensional ink stick body adapted to travel in a feed direction along the ink stick feed channel;

the ink stick body is adapted to be inserted into the ink stick feed channel in an insertion direction, substantially perpendicular to the feed direction;

wherein the ink stick body has a longitudinal ink stick guide element formed in an external surface of the ink stick body;

wherein the longitudinal ink stick guide element is positioned on the ink stick body to interact with the elongate feed channel guide rail and guide the ink stick along the solid ink feed channel as the ink stick travels in the feed direction;

wherein the longitudinal ink stick guide element is adapted to form a load bearing contact with the elongate feed channel guide rail when the ink stick is inserted into the ink stick feed channel;

wherein the ink stick guide element comprises an elongate protrusion along an external surface of the ink stick body; and a recess in the elongate protrusion of the ink stick guide element forms an ink stick sensing element that is positioned to contact a movable counter element in the ink stick feed channel.

23. The ink stick of claim 22, wherein:

the ink stick body has a lateral center of gravity in the lateral dimension that is substantially perpendicular to the feed direction and to the insertion direction; and wherein the position of the guide element is laterally offset to one side of the lateral center of gravity.

24. An ink stick for use in a solid ink feed system of a phase change ink jet printer, wherein the feed system comprises an ink stick feed channel having a feed channel guide rail, the ink stick comprising:

an ink stick body having a lateral dimension;

an ink stick guide element; and wherein the ink stick body has a lateral center of gravity along the lateral dimension of the ink stick body;

wherein the first ink stick guide element is formed as a part of the bottom portion of the ink stick body;

wherein the first ink stick guide element is adapted so that when the ink stick is placed in the feed channel of the solid ink feed system with the first ink stick guide element contacting the feed channel guide rail, the contact between the first ink stick guide element and the feed channel guide rail is a load-bearing contact;

wherein the first ink stick guide element is laterally offset between a first lateral side extremity and the lateral center of gravity of the ink stick body; and wherein the second ink stick guide element is laterally offset to a second side from the lateral center of gravity of the ink stick body, opposite the first side;

an ink stick sensing element formed in one of the ink stick guided elements and adapted to engage a movable counter element in the ink stick feed channel.

* * * * *